US011635408B2

(12) United States Patent
Hafenrichter et al.

(10) Patent No.: US 11,635,408 B2
(45) Date of Patent: Apr. 25, 2023

(54) METHOD FOR TRACKING LOCATION OF TWO-DIMENSIONAL NON-DESTRUCTIVE INSPECTION SCANNER ON TARGET OBJECT USING SCANNED STRUCTURAL FEATURES

(71) Applicant: The Boeing Company, Chicago, IL (US)

(72) Inventors: Joseph L. Hafenrichter, Seattle, WA (US); James J. Troy, Issaquah, WA (US); Gary E. Georgeson, Tacoma, WA (US)

(73) Assignee: The Boeing Company, Arlington, VA (US)

( * ) Notice: Subject to any disclaimer, the term of this patent is extended or adjusted under 35 U.S.C. 154(b) by 783 days.

(21) Appl. No.: 16/580,200

(22) Filed: Sep. 24, 2019

(65) Prior Publication Data

US 2021/0089817 A1    Mar. 25, 2021

(51) Int. Cl.
*G06T 7/33* (2017.01)
*G01N 29/06* (2006.01)
(Continued)

(52) U.S. Cl.
CPC .......... *G01N 29/0645* (2013.01); *B64F 5/60* (2017.01); *G01N 22/02* (2013.01); *G01N 29/043* (2013.01);
(Continued)

(58) Field of Classification Search
CPC .. G06V 10/757; G06V 10/267; G06V 30/142; B64F 5/60; G01N 22/02;
(Continued)

(56) References Cited

U.S. PATENT DOCUMENTS 7,743,660 B2   6/2010   Marsh et al.
8,453,928 B2   6/2013   Melandso et al.
(Continued)

FOREIGN PATENT DOCUMENTS

WO   2018104264 A1   6/2018

OTHER PUBLICATIONS

Extended European Search Report dated Mar. 4, 2021 in European Patent Application No. 20198045.5 (European counterpart of the instant U.S. patent application).
(Continued)

*Primary Examiner* — Claire X Wang
*Assistant Examiner* — Han Hoang
(74) *Attorney, Agent, or Firm* — Ostrager Chong Flaherty & Broitman P.C.

(57) ABSTRACT

Systems and methods for tracking the location of a non-destructive inspection (NDI) scanner using images of a target object acquired by the NDI scanner. The system includes a frame, an NDI scanner supported by the frame, a system configured to enable motorized movement of the frame, and a computer system communicatively coupled to receive sensor data from the NDI scanner and track the location of the NDI scanner. The NDI scanner includes a two-dimensional (2-D) array of sensors. Subsurface depth sensor data is repeatedly (recurrently, continually) acquired by and output from the 2-D sensor array while at different locations on a surface of the target object. The resulting 2-D scan image sequence is fed into an image processing and feature point comparison module that is configured to track the location of the scanner relative to the target object using virtual features visible in the acquired scan images.

17 Claims, 23 Drawing Sheets

(51) Int. Cl.
*B64F 5/60* (2017.01)
*G01N 22/02* (2006.01)
*G01N 29/04* (2006.01)
*G01N 29/28* (2006.01)
*G06T 7/73* (2017.01)
*G06V 30/142* (2022.01)
*G06V 10/26* (2022.01)

(52) U.S. Cl.
CPC .............. *G01N 29/28* (2013.01); *G06T 7/33* (2017.01); *G06T 7/73* (2017.01); *G06V 10/267* (2022.01); *G06V 30/142* (2022.01); *G01N 2291/2638* (2013.01)

(58) Field of Classification Search
CPC .............. G01N 29/043; G01N 29/28; G01N 2291/2638; G01N 29/0654; G01N 2291/0231; G01N 29/225; G01N 29/265; G01N 29/0645; G01N 2291/023; G06T 7/33; G06T 7/73
See application file for complete search history.

(56) References Cited

U.S. PATENT DOCUMENTS

| | | |
|---|---|---|
| 8,738,226 B2 | 5/2014 | Troy et al. |
| 8,744,133 B1 | 6/2014 | Troy et al. |
| 8,880,340 B2 | 11/2014 | Erignac et al. |
| 9,470,658 B2 | 10/2016 | Troy et al. |
| 9,689,844 B2 | 6/2017 | Holmes et al. |
| 9,915,633 B2 | 3/2018 | Georgeson et al. |
| 9,933,396 B2 | 4/2018 | Fetzer et al. |
| 10,168,287 B2 | 1/2019 | Georgeson et al. |
| 10,209,223 B2 | 2/2019 | Kollgaard et al. |
| 2005/0237581 A1* | 10/2005 | Knighton ............... G06V 10/24 358/473 |
| 2008/0165360 A1 | 7/2008 | Johnston |
| 2014/0002642 A1* | 1/2014 | Swiegot .................... G06T 7/73 348/137 |
| 2015/0381999 A1* | 12/2015 | Chuang .................. H04N 19/61 375/240.16 |
| 2016/0202689 A1* | 7/2016 | Szarski .............. G05B 19/4097 901/41 |
| 2019/0051010 A1* | 2/2019 | Zhu ........................... G06T 7/55 |

OTHER PUBLICATIONS

Invitation pursuant to Rule 62a(1) EPC dated Dec. 4, 2020 in European Patent Application No. 20198045.5 (European counterpart to the instant U.S. patent application).
Besl et al., "A Method for Registration of 3-D Shapes", IEEE Trans. on Pattern Analysis and Machine Intelligence, vol. 14, No. 2, Feb. 1992, pp. 239-256.

* cited by examiner

METHOD FOR TRACKING LOCATION OF TWO-DIMENSIONAL NON-DESTRUCTIVE INSPECTION SCANNER ON TARGET OBJECT USING SCANNED STRUCTURAL FEATURES

BACKGROUND

This disclosure generally relates to systems and methods for tracking the location of a scanner as it moves over a target area (e.g., a surface of a target object). In particular, this disclosure relates to systems and methods for tracking the location of a non-destructive inspection scanner (hereinafter "NDI scanner"). As used herein, the term "location" includes position in a coordinate system and orientation relative to that coordinate system.

Various types of imagers may be utilized to perform non-destructive inspection (NDI) on target objects. One or more imagers may move over the portion of the structure to be examined, and acquire scan image data representing characteristics or features (e.g., boundaries of objects or surfaces) of the structure. For example, a pulse-echo, thru-transmission, or shear wave sensor may be utilized to obtain ultrasonic data, such as thickness gauging, detection of laminar defects and porosity, and/or crack detection in the structure. Resonance, pitch/catch or mechanical impedance sensors may be utilized to provide indications of voids or porosity, such as in adhesive bondlines of the structure. In addition, single and dual eddy current sensors impart and detect eddy currents within a structure to provide data for detecting cracks and/or corrosion, particularly in metallic and other conductive structures.

As used herein, the term "sensor data" means analog data acquired by a two-dimensional (2-D) sensor array, which may be part of an NDI scanner (also referred to herein as "2-D NDI scanner") that additionally includes a digital signal processor. As used herein, the term "scan image data" means digital data in the form of a 2-D matrix of pixel values (hereinafter "pixels") derived from sensor data. For example, a 2-D sensor array may acquire respective analog sensor data which is converted to a corresponding 2-D matrix of pixels representing an image of the subsurface structure of a portion of a target object confronting the 2-D sensor array.

Some existing solutions for inspecting a structure include motion platforms (e.g., robotic crawler vehicles or end effectors mounted to a manipulator arm of a robot) having a frame that supports an NDI scanner. The frame may be moved over the outer mold line of a structure. In alternative embodiments, the motion platform may be designed for manual movement.

Effective use of such motion platforms often depends on their accurate localization within the environment within which they move. A number of localization solutions have been developed that may be used for this purpose. Some existing localization systems need separate location measurement components, such as rotational incremental encoders. It may be desirable to provide a system and a method of NDI which avoids the use of rotational incremental encoders dedicated to a location tracking function.

SUMMARY

The subject matter disclosed herein is directed to systems and methods for tracking the location of a non-destructive inspection (NDI) scanner using images of a target object acquired by the NDI scanner (hereinafter referred to as "localization"). The target object has features representing geometric elements, such as object boundaries, discontinuity in depth and/or material type, and surface boundaries (hereinafter "structural features"). In accordance with some embodiments, the system includes a frame, an NDI scanner supported by the frame, a robotic system configured to enable motorized movement of the frame, and a computer system communicatively coupled to receive sensor data from the NDI scanner and track the location of the NDI scanner. The NDI scanner includes a two-dimensional array of sensors (hereinafter "2-D sensor array").

In accordance with some embodiments, subsurface depth sensor data is repeatedly (recurrently, continually) acquired by and output from the 2-D sensor array while at different locations on a surface of the target object. The resulting 2-D scan image sequence is fed into an image processing and feature point comparison module that is configured to track the location of the scanner relative to the target object using virtual features (hereinafter "features") visible in the acquired scan images. Optionally, a composite scan image construction module is configured to construct a composite scan image containing (virtual) features corresponding to structural features in the target object by stitching sequential scan images together.

The image processing and feature point comparison module is configured to track the location of the NDI scanner relative to the target object using scan image data derived from sensor data. The image processing and feature point comparison module receives successive partially overlapping scan images and then compares the partially overlapping scan images to find common features. The image processing and feature point comparison module is further configured to calculate the current location of the scanner on the surface of the target object based on the previous location and a change in location relative to the previous location, The change in location is determined based on changes in the positions of one or more common feature points in respective partially overlapping scan images.

As used herein, the term "feature point" means a point of a feature that appears in a scan image. For example, a feature point may be the centroid of the feature. As used herein, the term "common feature" means a feature that appears in two successive scan images. As used herein, the term "common feature point" means a point of a common feature. For example, a common feature point may include a point of a common feature in a first scan image and the same point of the same common feature in a second scan image. The method disclosed herein may be used to determine an offset (including position and orientation) between successive scan images provided that the successive scan images include at least two common feature points. In a case where the NDI scanner translates but does not rotate, then a position offset between successive scan images may be determined using one common feature point.

In accordance with some embodiments, the composite scan image construction module starts with an initial image and then continually constructs and updates a composite image by continually stitching new image data to the current composite image while omitting redundant information. The process is repeated until the entire surface of the structure is scanned. The composite scan image can be made of dozens or even hundreds of scan images, each scan image being partially overlapped with the immediately preceding and subsequent (in time) scan images.

The process disclosed herein enables localization for both manual and automated NDI applications without the need for rotational incremental encoders. Optionally, the localization process may include a correction step to reorient the sensor array, such as an occasional manual check and manual correction of position and orientation. Mapping of systematic correction values can also be used to identify mistakes in fabrication, like the mis-positioning or omission of substructure (e.g., subsurface features).

Although various embodiments of systems and methods for tracking the location of an NDI scanner using scan images acquired from the target object are described in some detail later herein, one or more of those embodiments may be characterized by one or more of the following aspects.

One aspect of the subject matter disclosed in detail below is a method for tracking a location of a scanner, the method comprising: (a) placing a sensor array of a scanner adjacent to a surface of a target object so that the sensor array overlies a first structural feature of the target object with a reference point on the sensor array at a first position having first X and first Y position coordinates on the surface of the target object which are known; (b) acquiring a first set of sensor data from a first portion of the target object confronting the sensor array while the reference point on the sensor array is at the first position; (c) converting the first set of sensor data to first scan image data of a first scan image; (d) translating the scanner over the surface of the target object until the reference point is at a second position at a distance from the first position while the sensor array again overlies the first structural feature; (e) acquiring a second set of sensor data from a second portion of the target object confronting the sensor array while the reference point is at the second position; (f) converting the second set of sensor data to second scan image data of a second scan image; (g) finding feature points in the first and second scan images; (h) determining which feature points found in step (g) are common feature points in the first and second scan images; (i) computing pixel position differences between the common feature points; and (j) calculating a second Y position coordinate of the reference point at the second position on the surface of the target object based at least partly on the first Y position coordinate and the pixel position differences computed in step (i). Steps (h) and (i) may be performed separately or concurrently. As used herein, the phrase "finding feature points" means searching a scan image for pixels or groups of pixels that meet feature selection criteria.

In accordance with some embodiments of the method described in the immediately preceding paragraph, step (j) comprises: calculating a first pixel offset equal to a number of pixel rows of the sensor array by which the position of a common feature point in the second scan image is offset from the position of the common feature point in the first scan image; multiplying the first pixel offset by a distance between adjacent sensor rows to form a product equal to a first distance translated by the scanner in a direction perpendicular to the sensor rows during step (d); and adding the first distance to the first Y position coordinate to derive the second Y position coordinate of the reference point.

For cases in which sensor translation is not parallel to the Y axis, the method in accordance with one proposed implementation further comprises: (k) calculating a second X position coordinate of the reference point on the sensor array on the surface of the target object based at least partly on the first X position coordinate and a second difference between the respective positions of the common feature point in the first and second scan images; and calculating a distance between a first point having the first X and first Y position coordinates and a second point having the second X and second Y position coordinates. In such cases, step (j) comprises: calculating a first pixel offset equal to a number of pixel rows by which the position of the common feature point in the second scan image is offset from the position of the common feature point in the first scan image; multiplying the first pixel offset by a distance between adjacent sensor rows to form a product equal to a first distance translated by the scanner in a direction perpendicular to the sensor rows during step (d); and adding the first distance to the first Y position coordinate to derive the second Y position coordinate, and step (k) comprises: calculating a second pixel offset equal to a number of pixel columns by which the position of the common feature point in the second scan image is offset from the position of the common feature point in the first scan image; multiplying the second pixel offset by a distance between adjacent sensor columns to form a product equal to a second distance translated by the scanner in a direction parallel to the sensor rows during step (k); and adding the second distance to the first X position coordinate to derive the second X position coordinate.

In accordance with some embodiments, the method further comprises: processing the first and second scan images to form a composite scan image by aligning the second scan image data in the second scan image with the first scan image data in the first scan image using a common feature point in the first and second scan images; finding a feature point in the composite scan image associated with a second structural feature in the target object; calculating a third Y position coordinate of the feature point based at least partly on the first Y position coordinate of the reference point; and calculating a third X position coordinate of the feature point based at least partly on the first X position coordinate of the reference point.

Another aspect of the subject matter disclosed in detail below is a method for tracking a location of a scanner, the method comprising: (a) placing a sensor array of a scanner adjacent to a surface of a target object so that the sensor array overlies first and second structural features of the target object and is oriented at a first orientation angle which is known; (b) acquiring a first set of sensor data from a first portion of the target object confronting the sensor array while the sensor array is oriented at the first orientation angle; (c) converting the first set of sensor data to first scan image data of a first scan image; (d) orienting the scanner so that the sensor array has a second orientation angle different than the first orientation angle and again overlies the first and second structural features; (e) acquiring a second set of sensor data from a second portion of the target object confronting the sensor array while the sensor array is oriented at the first orientation angle; (f) converting the second set of sensor data to second scan image data of a second scan image; (g) finding feature points in the first and second scan images; (h) determining which feature points found in step (g) are common feature points in the first and second scan images; (i) computing pixel position differences between first and second common feature points; and (j) calculating the second orientation angle based at least partly on the first orientation angle and a difference of a first angle of a first line connecting respective positions of the first and second common feature points in the first scan image and a second angle of a second line connecting respective positions of the first and second common feature points in the second scan image.

In accordance with some embodiments of the method described in the immediately preceding paragraph, step (i) comprises: calculating a first pixel offset equal to a number of pixel rows by which the position of the second common feature point in the first scan image is offset from the position of the first common feature point in the first scan image; calculating a second pixel offset equal to a number of pixel columns by which the position of the second common feature point in the first scan image is offset from the position of the first common feature point in the first scan image; calculating a third pixel offset equal to a number of pixel rows by which the position of the second common feature point in the second scan image is offset from the position of the first common feature point in the second scan image; and calculating a fourth pixel offset equal to a number of pixel columns by which the position of the second common feature point in the second scan image is offset from the position of the first common feature point in the second scan image, wherein the first angle has a tangent equal to a ratio of the first pixel offset to the second pixel offset and the second angle has a tangent equal to a ratio of the third pixel offset to the fourth pixel offset.

A further aspect of the subject matter disclosed in detail below is a system comprising a frame, a scanner supported by the frame, a robotic system configured to enable motorized movement of the frame, and a computer system communicatively coupled to receive sensor data from the sensors and send control signals to the robotic system for controlling motorized movement of the frame, wherein the scanner comprises an array of sensors and the computer system is configured to perform operations comprising: (a) activating the sensors while the sensor array overlies a first structural feature of a target object with a reference point on the sensor array at a first position having first X and first Y position coordinates on a surface of a target object which are known; (b) receiving a first set of sensor data acquired from a first portion of the target object confronting the sensor array while the reference point is at the first position; (c) converting the first set of sensor data to first scan image data of a first scan image; (d) activating the sensors while the sensor array overlies the first structural feature of a target object with the reference point at a second position at a distance from the first position; (e) receiving a second set of sensor data acquired from a second portion of the target object confronting the sensor array while the reference point is at the second position; (f) converting the second set of sensor data to second scan image data of a second scan image; (g) finding feature points in the first and second scan images; (h) determining which feature points found in step (g) are common feature points in the first and second scan images; (i) computing pixel position differences between the common feature points in the first and second scan images; and (j) calculating a second Y position coordinate of the reference point at the second position on the surface of the target object based at least partly on the first Y position coordinate and the pixel position differences computed in step (i).

Other aspects of systems and methods for tracking the location of an NDI scanner using scan images acquired from the target object are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

Reference will hereinafter be made to the drawings in which similar elements in different drawings bear the same reference numerals.

DETAILED DESCRIPTION

Figure 1:
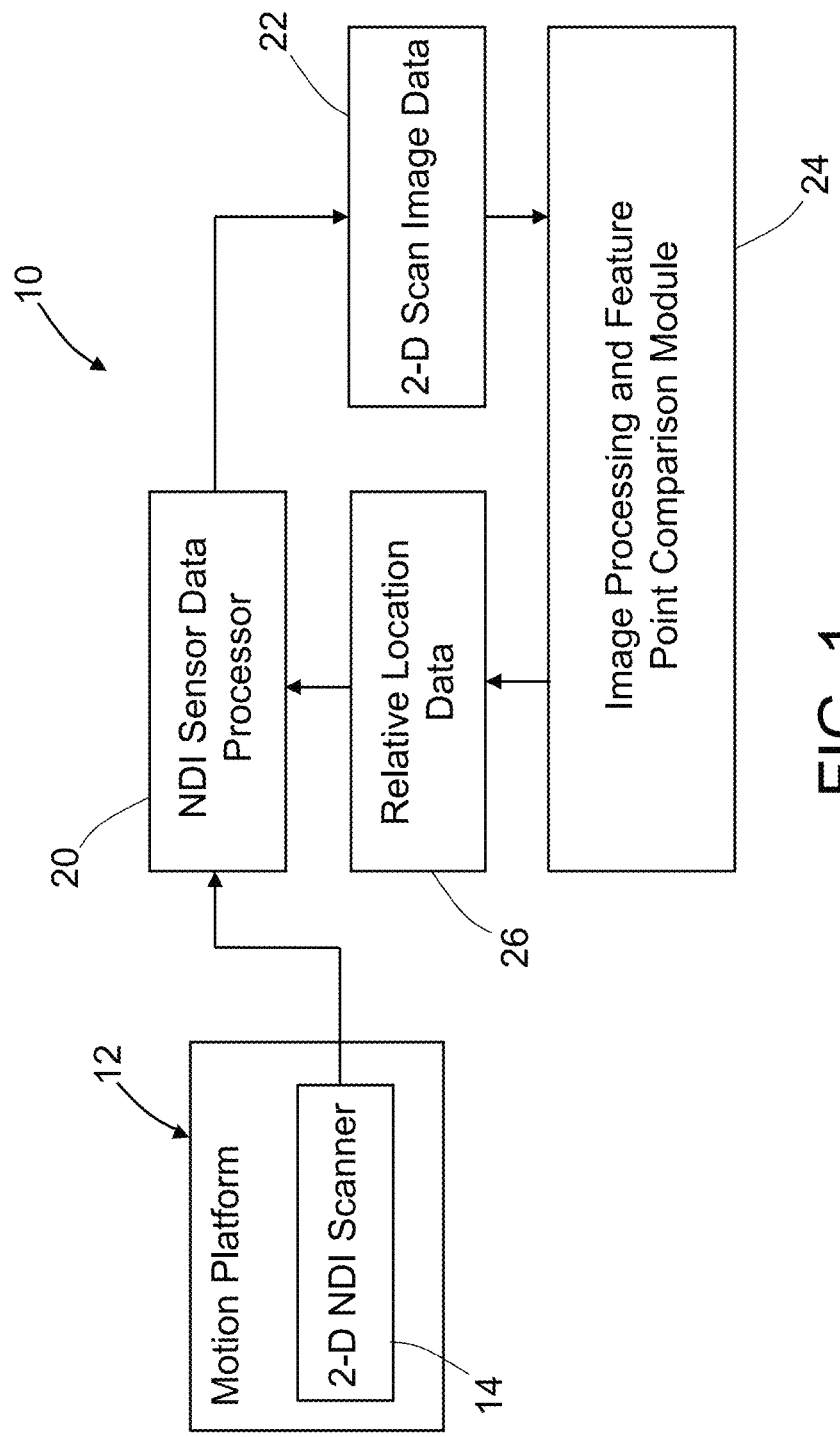
FIG. 1 is a block diagram identifying some components of a system for tracking the location of an NDI scanner comprising a two-dimensional array of sensors in accordance with one embodiment.

For the purpose of illustration, systems and methods for tracking the location of an NDI scanner using scan images acquired from the target object will now be described in detail. However, not all features of an actual implementation are described in this specification. A person skilled in the art will appreciate that in the development of any such embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

In accordance with some embodiments, the system includes an image processing and feature point comparison module which is configured to track the location of the scanner relative to the target object using scan image data derived from sensor data. The image processing and feature point comparison module receives and processes successive partially overlapping scan images and then compares the partially overlapping scan images to find common feature points. The image processing and feature point comparison module is further configured to calculate the current location (position and orientation) of the scanner on the surface of the target object based on the previous location and a change in location relative to the previous location The change in location is determined based on changes in the positions of pixels representing common feature points in respective partially overlapping scan images.

Given by way of non-limiting example for illustration purposes only, the target object may be an aircraft part, such as a barrel-shaped section of an aircraft fuselage. It should be appreciated, however, that the systems and methods described hereinafter with reference to a fuselage section may also be applied to other types of workpieces which are part of some other type of vehicle or structure.

Moreover, the workpiece may be made of any material as desired for a particular application. It will be appreciated that the type of material used for the workpiece may, in part, determine which type of non-destructive inspection technique is used to inspect the workpiece. Given by way of non-limiting examples, the workpiece may be made of composite material, such as a composite laminate made of fiber-reinforced plastic, or a metal, such as aluminum or titanium. It will be understood that it is not intended to limit in any manner whatsoever the materials from which the workpiece to be inspected may be made.

Depending on the type of material being inspected, any one of a multiplicity of types of NDI sensors can be utilized. The method proposed herein may be applied to any 2-D NDI imager, including imagers in which a 2-D array of sensors (such as ultrasonic transducers or eddy current coils) are in contact with the surface being inspected. In alternative embodiments, an infrared thermography flash system, a terahertz camera, a microwave imager, or a laser Doppler vibrometry system could produce non-contact 2-D images that are digitized/pixelized in the X-Y format and can be overlapped, aligned and used for tracking purposes.

In the context of the specific application of inspecting fuselage sections, the scanning system may comprise means for scanning the skin of the fuselage section from a vantage point external to the fuselage section. In the embodiments disclosed below, the scanning means is an NDI scanner in the form of a 2-D sensor array that collects sensor data from a confronting portion of the fuselage section. In one proposed implementation, the NDI scanner scans the outer mold line of the fuselage section in a serpentine pattern. For example, the NDI scanner moves vertically upward parallel to an X axis.

As used herein, the terms "X axis" and "Y axis" refer to respective axes which intersect at right angles at an origin on a surface of a target object and which follow the contour of the surface as the axes extend away from the origin. In cases wherein the surface is planar (flat), the X and Y axes are straight, co-planar and mutually perpendicular. In cases wherein the surface is curved in the Y direction and straight in the X direction, the Y axis is locally tangent to the surface. In cases wherein the surface is curved in both the X and Y directions, the X and Y axes are both locally tangent to the surface. In each case, the Y position coordinate of a point on the surface is measured along the Y axis and equal to a first distance from the origin, while the X position coordinate of the point on the surface is measured along the X axis and equal to a second distance from the origin. On the one hand, if the axis is straight, then the position coordinate is equal to the distance of the point from the origin; on the other hand, if the axis is arc-shaped (because the surface of the target object is curved), then the position coordinate is equal to the arc length (not the chord length) from the origin.

FIG. 1 is a block diagram identifying some components of a system 10 for tracking the location of an NDI scanner 14 comprising a two-dimensional array of sensors in accordance with one embodiment. In this embodiment, the NDI scanner 14 is mounted on a motion platform 12 (e.g., a robotic crawler vehicle). The motion platform 12 may be of a type that is moved manually by a human operator or of a type that is motorized for automated movement. During a scanning operation, the NDI scanner 14 is placed at successive locations on a surface of a target object as a result of successive movements of the motion platform 12. At each scan location, the NDI scanner 14 is activated to acquire sensor data from a respective confronting portion of the target object surface.

In accordance with some embodiments, the NDI scanner 14 is rigid, so the sensor array would not directly conform to the surface of the target object, but in most situations the NDI scanner 14 would be mounted in a two-axis gimbal which would allow the sensor array to align generally with the surface. (This is a reasonable compromise, since the sensor array is typically small compared to the curvature of the surface.) Also, if the sensors are ultrasonic transducers, an acoustic couplant may be used between the sensor array and the surface (e.g., water or some type of gel-like substance or dry acoustic couplant elastomeric material). The presence of acoustic couplant provides some ability to compensate for slight curvature mismatch.

The system 10 partly depicted in FIG. 1 further includes an NDI sensor data processor 20 that is communicatively coupled (via cables or wirelessly) to the NDI scanner 14. The NDI sensor data processor 20 is configured to convert sensor data output by the NDI scanner 14 to 2-D scan image data 22. In addition, the system 10 includes an image processing and feature point comparison module 24 which is communicatively coupled to receive 2-D scan image data 22 from the NDI sensor data processor 20. The image processing and feature point comparison module 24 may be a processor or computer configured (e.g., programmed) to track the location (also referred to herein as "localization") of the NDI scanner 14 relative to the surface of the target object using the 2-D scan image data 22. The localization algorithm includes a relative motion updating process based on following scanned features from one captured NDI scan image to the next in order to determine motion of 2-D sensor array.

The NDI sensor data processor 20 does not compute location data. The NDI sensor data processor 20 processes the sensor data acquired by the 2-D sensor array to create the 2-D scan images that will be used by the image processing and feature point comparison module 24 to determine relative location. After the image processing and feature point comparison module 24 has computed the relative location data 26, the relative location data 26 may be fed back to the NDI sensor data processor 20 in order to create composite scan images. If a composite scan image is not needed (e.g., if the system was being used only for localization and not NDI composite image creation), then the relative location data 22 would not need to be sent back to the NDI sensor data processor 20.

In some situations, the NDI sensor data processor 20 may only be able to accept relative location data 22 for composite scan image creation, which is the most common method currently in use, but in the future, more advanced techniques may be used for composite scan image generation, in which case absolute location information may be needed. FIG. 1 assumes that the NDI sensor data processor 20 generates the composite scan image using relative location data—but in other embodiments, the composite scan image generation may be handled by a separate image processing application.

Figure 2A:
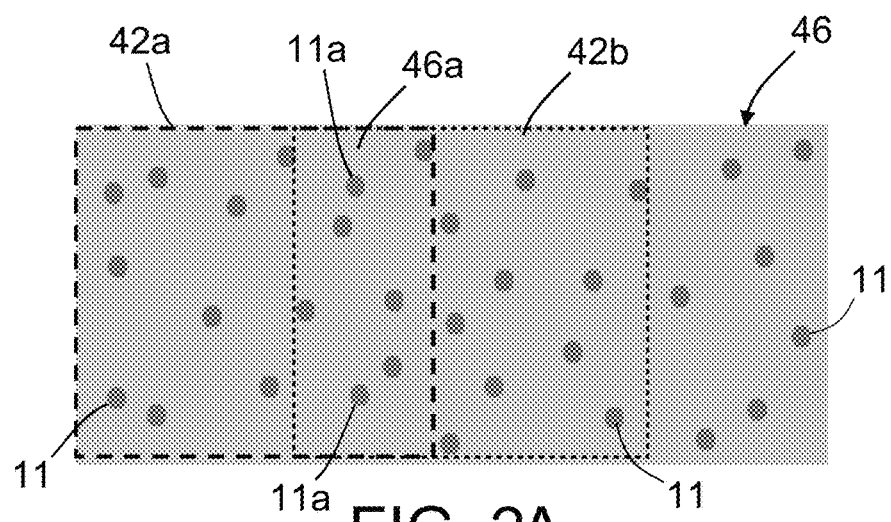
FIG. 2A is a diagram representing a full scan area of a target object having subsurface features.
Figure 2B:
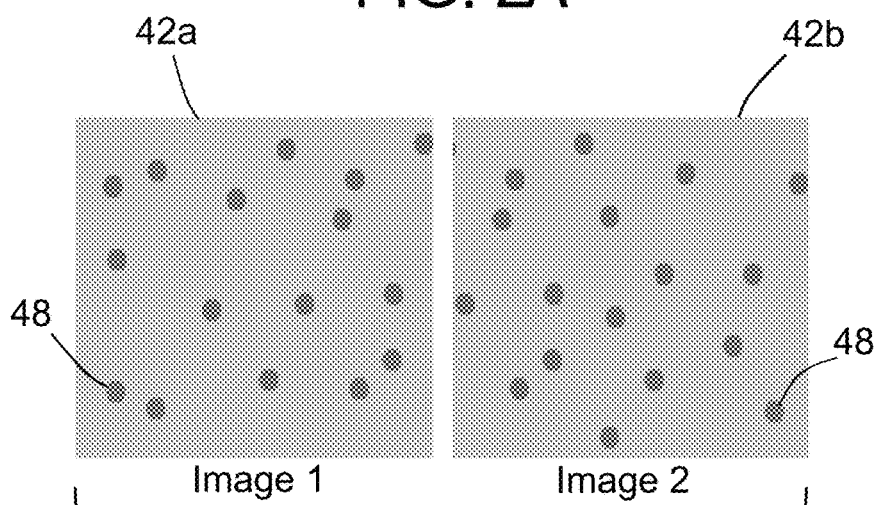
FIG. 2B is a diagram representing sequential scan images captured by an NDI scanner from respective partially overlapping portions of the full scan area depicted in FIG. 2A.

FIG. 2A shows a full scan area 46 of a target object having random structural features 11 (represented by dots in this example). A dashed rectangle superimposed on the full scan area 46 encompasses a first portion of the full scan area 46 that will be captured in a first scan image 42a when the NDI scanner 14 is at a first location; a dotted rectangle superimposed on the full scan area 46 encompasses a second portion of the full scan area 46 captured in a second scan image 42a when the NDI scanner 14 is at a second location displaced from the first location by a distance less than the length of the 2-D sensor array. The first and second portions of the full scan area share a common area 46a shown in FIG. 2A. The scan images 42a and 42b are shown separately in FIG. 2B.

Figure 2C:
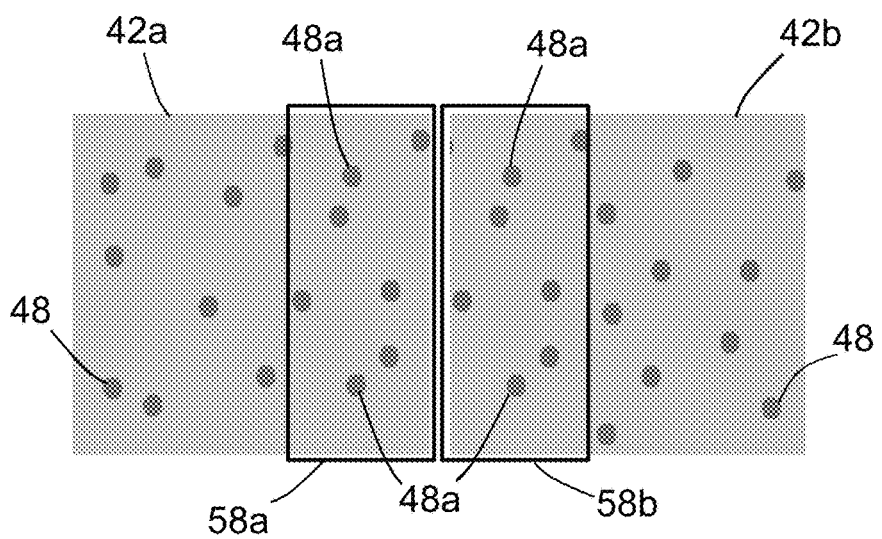
FIG. 2C is a diagram representing sequential scan images containing pixels representing common features acquired in the area of partial overlap depicted in FIG. 2A.

As seen in FIG. 2A, the first and second portions of the full scan area which respectively appear in scan images 42a and 42b have a common scan area 46a with common features 11a. Common feature points 48a appear in respective regions 58a and 58b of scan images 42a and 42b, as seen in FIG. 2C. Since regions 58a and 58b of scan images 42a and 42b are images of the same rectangular scan area 46a, regions 58a and 58b will be identical (referred to hereinafter as "overlapping regions of the scan images"). These overlapping regions with common features in sequential (successive) scan images are used to track the second location relative to the first location of the NDI scanner 14. In addition, the redundant information in one of the scan images 42a or 42b can be omitted when the scan images 42a and 42b are stitched together to form a composite scan image.

The relative motion updating process proposed herein is based on the concept that partially overlapping sequential scan images will have some features (representing structural features in the target object) within the pair of images that are common. The assumption here is that the second scan image will have some features in common (hereinafter "common features") with the first scan image. The pixel distance difference between the respective positions of a common feature point in the first and second scan images is counted and scaled, and then the relative physical distance is added to the prior location estimate to get the new absolute location. In this setup, the common features are defined by significant local changes of intensity (high contrast) which occur within the scan images. The system does not need to know which structural features within the physical object are represented by these virtual features; the system merely needs to detect the same pattern of pixels in sequential scan images. The overall concept is sometimes referred to as "solving the camera pose problem"—in this case the "camera" is the NDI scanner. The system tracks the set of points in successive scan images and determines their 2-D position from one scan image to the next scan image to derive the relative displacement of the common feature points in the scan images. This information is then used to compute the relative physical motion (position and orientation) of the motion platform 12 on which the NDI scanner 14 is mounted, for the period of time between one scan image and the subsequent scan image. In order for this to work for both position and orientation, there needs to be a sufficient number of common features. Theoretically, the minimum is two, but it is better to have more common feature points in order to improve the estimate.

The use of feature point comparison in a localization process has been disclosed elsewhere. For example, the simultaneous localization and mapping (SLAM) method uses data from one or more optical cameras or laser scanners and an extended Kalman filter to: (1) update the current state (position) estimate using dead reckoning data; (2) update the estimated position based on re-observed features (landmarks); and (3) add new features (landmarks) to the current state. In SLAM, relative displacements of common feature points common to both images are used to provide the offset estimate. For this, relatively small position and orientation changes are required, along with substantial overlap between the images in order to achieve registration. Additionally, known reference dimensions of the 2-D sensor array are required to determine the scale of the displacement.

Various algorithms based on common feature points may be used to determine the distance moved by a scanner during a time interval separating two instants in time when two images are captured. These algorithms may be used to determine the position and orientation offsets between the two images. The process involves aligning two sets of common feature points acquired from the two images and determining the amount that one set of points had to be translated and rotated in order to achieve the optional alignment between the two sets of points. Such algorithms are configured to solve this point-to-point matching problem.

One of the methods that can be used determine the position and orientation offsets between the common feature points in two images (or more generally, between two sets of points) is to use the so-called Iterative Closest Point (ICP) algorithm, which is sometimes referred to as the "Iterative Corresponding Point" algorithm. In the present case the offsets are determined from the respective x and y pixel positions of common feature points in the two images.

The basic form of the ICP algorithm is described in a technical article entitled "A Method for Registration of 3-D Shapes", authored by Besl and McKay in 1992 (hereinafter "1992 article"). Variations of the IPC algorithm are used by several of the SLAM methods to align groups of points (this type of alignment is also known as "registration"). There are several speed improvements to the concept that allows SLAM to run faster than the basic form of the ICP method, but the core idea is the same. The 1992 article describes a solution for points in a 3-D space (x, y, z) as well as points in a 2-D space (x, y), in addition to other types of geometric data. The system disclosed herein uses the form of the ICP algorithm that involves point sets. This method determines how much a first set of points has to translate or rotate from its starting position and orientation to another position and orientation that minimizes the overall distance between the first set of points and a second set of points.

The basic form of the ICP algorithm is the following (1) for each point in a given set of point data, compute the closest point in the other set using a distance metric; (2) estimate the amounts of translation and rotation needed to align the sets of points; (3) transform the points in one set by the amount determined in the translation and rotation estimates; and (4) iterate (i.e., return to step (1) to compute the closest points again); and (5) stop the iteration when a predetermined distance metric value is achieved (e.g., a distance metric value equal to a specified threshold).

To start, the distance from each point in each set of points is determined using a distance measurement or "distance metric" (here a mean-square distance metric is used); then one of the point sets is moved (offset) in order to reduce the mean-square distance. The ICP method requires an initial estimate of the position and orientation offsets. In the instant application, a rough approximation of the offsets is made using the desired direction of travel and a current velocity estimate of the motion platform (this approximation does not have to be very accurate). Then the distance measurements are computed again, after which new estimates for the position and orientation offsets are computed using an iterative optimization method such as the gradient descent method. This iteration continues until a convergence criterion is reached. Ideally, if each point in one set had exactly one corresponding point in the other set of points and all of the points were acquired accurately, the overall offset determined by the mean-square distance metric would be zero, but since there may be outlier points in one set that do not align with points in the other set (as well as small errors in acquisition accuracy), the optimal mean-square distance will not be zero. For realistic scenarios in which there are some points in common between the two sets and some that are not common, the method will not reach a zero mean-square distance. So the overall method needs to determine when to stop the iterative search, which is usually when the rate of convergence slows to some specified amount.

The common feature points are the points with the smaller closest point distance values compared to the points with the largest closest point distance values. The basic ICP algorithm finds the common feature points along the way, but the ICP algorithm does not need to know which points they are before starting the rest of the processing. For the method to work, a sufficient number of common feature points are still required, but they don't need to be explicitly found in a dedicated separate step from the position and orientation offset determination process. As the iterations are performed, the common feature points are discovered, and in some variations of the ICP process, the not-common feature points (e.g., the outliers) are culled from the analysis early in the process in order to speed up the convergence (reducing the number of iterations needed). In other methods, or other variations of the ICP method, the outliers may be culled first from the common feature points to improve performance.

In summary, ICP technique uses common feature points between two sets of points to determine the position and orientation offsets of one point set relative to the other point set. Depending on the specific algorithm used, the finding of the common feature points from both sets of points may or may not be a separate step from the use of the points to determine the position and orientation offsets. For example, some versions of the ICP algorithm determine the common feature points concurrently with determining the position and orientation offsets.

As long as the 2-D sensor array of the NDI scanner 14 is large enough to always cover at least two structural features (e.g., structural features such as fasteners) of the target object, the image processing and feature point comparison module 24 of system 10 (see FIG. 1) is able to track the location of the sensor array by processing successive scan images containing common features representing the structural features. The 2-D sensor array is configured to capture all of the elements in the view area at once, and as long as some common features from part of the first scan image are visible in the second scan image, then it is possible to determine how much the 2-D sensor array has moved in the interval between successive image acquisitions. Knowing the physical size of the array—more specifically, the number of elements per inch—the image processing and feature point comparison module 24 is configured to count the difference in the respective positions of the common feature point in the two scan images and convert that difference into a relative location estimate. The image processing and feature point comparison module 24 outputs relative location data 26 which may be used for location tracking and other purposes. For example, the pixel difference between the respective representations of the common feature point is counted and converted to a physical distance traveled by the 2-D sensor array. This estimated travel distance is added to the prior absolute location estimate (measured in the frame of reference of the target object) to get a new estimate for the absolute location of the 2-D sensor array. Optionally (as depicted in FIG. 1), the relative location data 26 is sent to the NDI sensor data processor 20, where it may be used to construct a composite scan image (as will be described in more detail below).

To calculate the absolute displacement in the frame of reference of the surface of the target object, the system proposed herein sums the relative displacements together after each set of scan images is processed, which is known as dead reckoning. However, as more and more discrete relative distance values are added together, the absolute location estimate becomes less accurate, so to address this deviation, one may compare the features appearing in the scan images to landmarks/features with known coordinates. The absolute location estimate is updated based on these known coordinates, which serves to re-calibrate the system. The image-to-image feature tracking happens at a high update rate, and the comparison to known landmark/feature data happens at a lower update rate.

Figure 3:
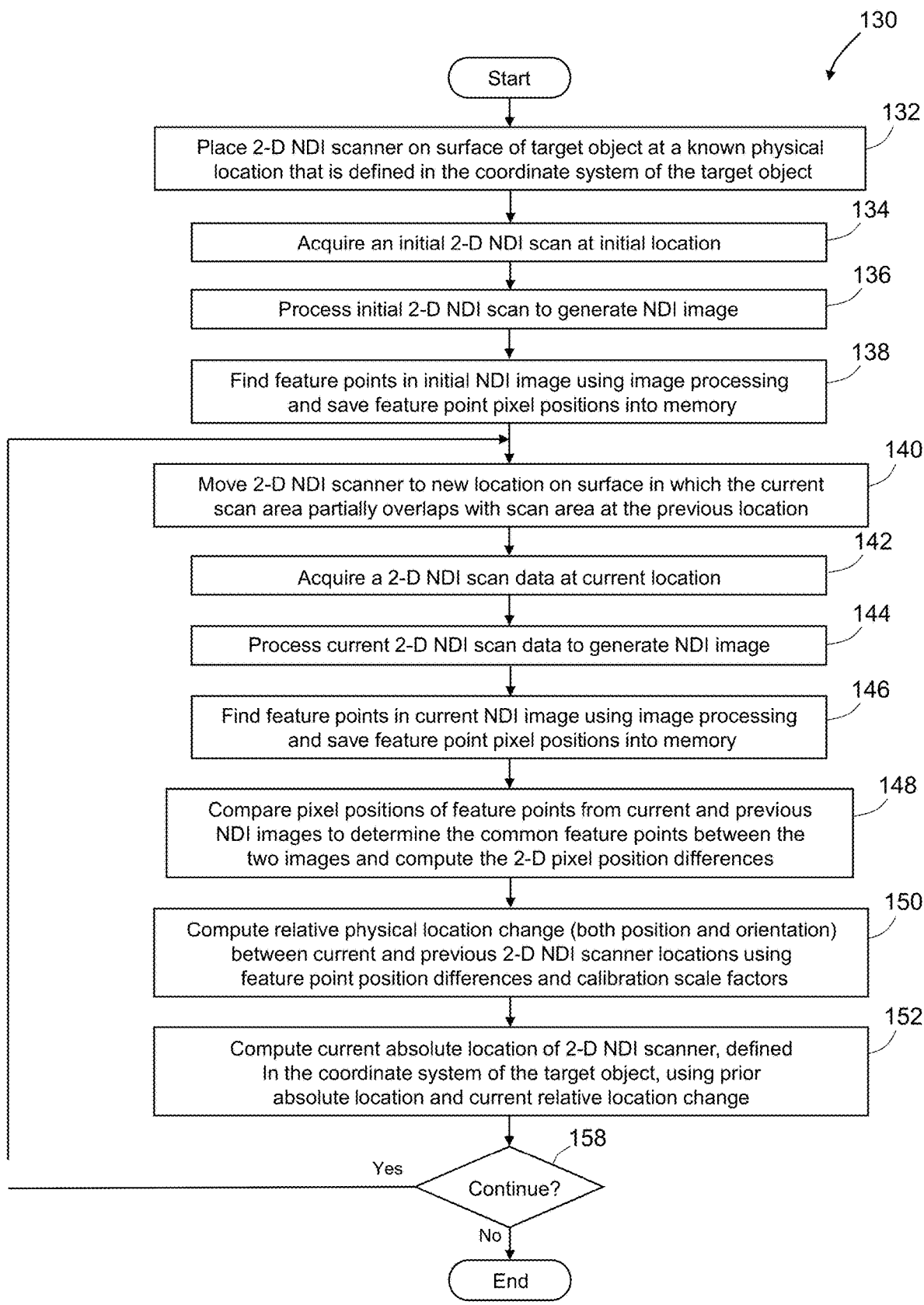
FIG. 3 is a flowchart identifying steps of a method for tracking a motion platform using images acquired by an NDI scanner comprising a two-dimensional array of sensors in accordance with one embodiment.

FIG. 3 is a flowchart identifying steps of a method 130 for tracking a motion platform using images acquired by 2-D sensor array of the NDI scanner 14 in accordance with one embodiment. The method 130 is applicable to either manual or automated motion control. First, the motion platform 12 is placed so that the 2-D sensor array of the NDI scanner 14 is located at a known physical location (hereinafter "initial location") that is defined in the frame of reference of a target object (step 132). At the initial location, the 2-D sensor array confronts a first portion of the surface of the target object with a known reference point on the sensor array (e.g., a center of the sensor array) at a first position having a known first X position coordinate and a known first Y position coordinate on the surface of the target object. The NDI scanner 14 is then activated to acquire a first scan consisting of a first set of sensor data from the first portion of the target object (step 134). The first set of sensor data acquired by the first scan is converted to a first scan image (step 136). For example, the NDI sensor data processor 20 converts the first set of sensor data output by the NDI scanner 14 to first scan image data of the first scan image. The image processing and feature point comparison module 24 then finds centroids of features (hereinafter "feature points") in the first scan image using image processing (e.g., edge detection) and saves the pixel positions of those feature points in a non-transitory tangible computer-readable storage medium (e.g., computer memory) (step 138).

The motion platform 12 is then moved so that the 2-D sensor array of the NDI scanner 14 is located at a new physical location (hereinafter "current location") on the surface of the target object at which the current scan area partially overlaps with the scan area at the initial location (step 140). In a case wherein the 2-D sensor array is translated without rotation along an axis parallel to either the rows or columns of the sensor array, the area of overlap must include at least one common feature (e.g., a subsurface feature) in the target object to enable continual location tracking. In a case wherein the 2-D sensor array is translated with rotation, the area of overlap must include at least two common features in the target object to enable continual location tracking.

At the current location, the 2-D sensor array confronts a second portion of the surface of the target object with the reference point on the sensor array at a second position having a unknown second X position coordinate and an unknown second Y position coordinate on the surface of the target object. The NDI scanner 14 is then activated to acquire a second scan consisting of a second set of sensor data from the second portion of the target object (step 142). The second set of sensor data acquired by the second scan is converted to a second scan image (step 144). For example, the NDI sensor data processor 20 converts the second set of sensor data output by the NDI scanner 14 to second scan image data of the second scan image. The image processing and feature point comparison module 24 then finds the feature points in the second scan image using image processing and saves the pixel positions of those common features in the non-transitory tangible computer-readable storage medium (step 146).

The image processing and feature point comparison module 24 is further configured to compare pixel positions of common feature points appearing in the previous and current scan images (in this iteration, the first and second scan images) to determine the common feature points appearing in the two images and compute the 2-D pixel position differences (step 148). Then the image processing and feature point comparison module 24 computes a relative physical location change (both position and orientation) between the current and previous locations of the NDI scanner 14 using the 2-D pixel position differences of the common feature points and calibration scale factors (step 150). The process described herein assumes that calibration scale factors are available for the 2-D NDI scanner 14 that relate the device's individual scan elements (which are associated with the pixels in the NDI scan image) to a physical distance. This type of data would be available from the device manufacturer's specification sheet.

The image processing and feature point comparison module 24 (or a different computer or processor) may then compute the current absolute location of the NDI scanner 14, defined in a coordinate system (frame of reference) of the target object (e.g., an X-Y coordinate system laid on the surface of the target object, as described above), using the prior absolute location and the current relative location change (step 152).

A determination is then made whether the localization process should continue (step 158). On the one hand, if a determination is made in step 158 that the localization process should continue, method 130 returns to step 140. Then the next scan image is acquired, which third scan image will have some features in common with the second scan image, and so forth. On the other hand, if a determination is made in step 158 that the localization process should not continue, then method 130 is terminated.

Figure 4:
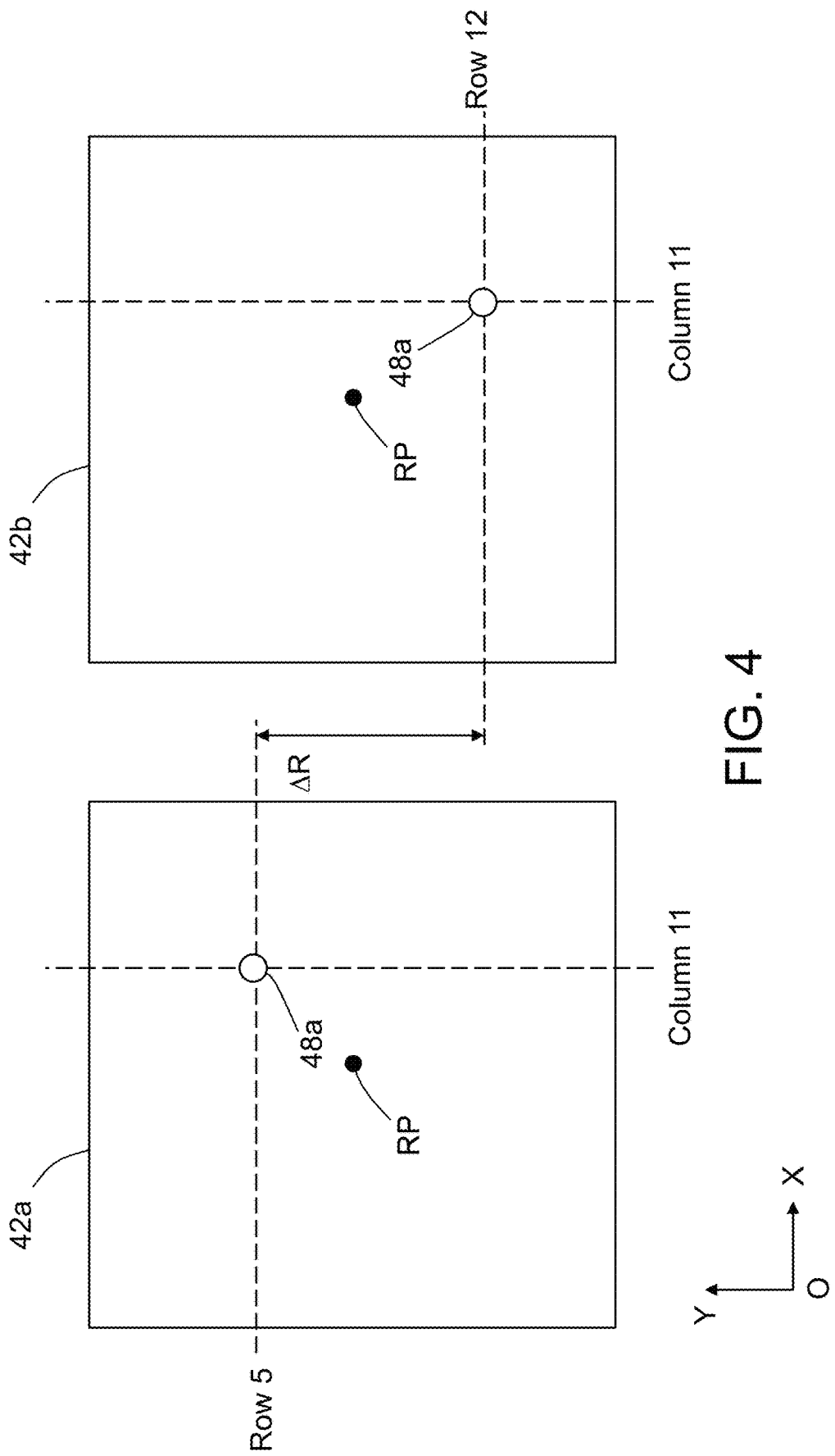
FIG. 4 is a diagram showing the positions of a common feature in respective scan images acquired in succession at respective vertically aligned locations (no rotation) using a two-dimensional sensor array having sensors arranged in rows and columns.

FIG. 4 is a diagram showing the positions of a common feature point 48a in respective scan images 42a and 42b acquired in succession at respective vertically aligned locations (no rotation) using a 2-D sensor array having sensors arranged in rows and columns and having a reference point RP at the center of the 2-D sensor array. (The reference point may be at any known location on the 2-D sensor array.) This example assumes that the motion platform 12 is controlled or constrained to move the NDI scanner 14 parallel to a Y axis on the surface of the target object with the sensor rows perpendicular to the Y axis (without rotation), in which case the reference point RP is moved from a first position having a first X position coordinate and a first Y position coordinate in a frame of reference on the surface of the target object to a second position having the first (same) X position coordinate and a second Y position coordinate at a distance from the first Y position coordinate. The second Y position coordinate is calculated by adding the change in pixel position (e.g., pixel row) in scan image 42b relative to the pixel position (e.g., pixel row) in scan image 42a. This change in pixel position in terms of pixel rows is indicated by $\Delta R$ in FIG. 4. In this example, the pixel containing the common feature point 48a in scan image 42a is positioned in Row 5 and Column 11, whereas the pixel containing the common feature point 48a in scan image 42b is positioned in Row 12 and Column 11, meaning that $\Delta R=7$ rows. Thus, the scan images 42a and 42b indicate that the 2-D sensor array was moved in the Y direction by a distance equal to the product of $\Delta R$ times a calibration scale factor $f_{cal}$, which calibration scale factor is equal to the distance between the centerlines of adjacent rows of sensors in the 2-D sensor array.

More specifically, the image processing and feature point comparison module 24 is configured to: (a) find X and Y pixel position values for feature points in the first and second scan images; (b) determine which feature points found in step (a) are common feature points appearing in the first and second scan images; (c) compute pixel position differences between the common feature points appearing in the first and second scan images; and (d) calculate the second Y position coordinate of the reference point RP at the second position on the surface of the target object by adding the product $\Delta R \Box f_{cal}$ to the first Y position coordinate.

In accordance with one proposed implementation, steps (c) and (d) comprise: calculating a first pixel offset equal to a number of pixel rows of the sensor array by which the position of the common feature point 48a in the second scan image is offset from the position of the common feature point 48a in the first scan image; multiplying the first pixel offset by a distance between the respective centerlines of adjacent sensor rows to form a product equal to a first distance translated by the scanner in a direction perpendicular to the sensor rows; and adding the first distance to the first Y position coordinate to derive the second Y position coordinate of the reference point RP.

The same principles may be applied in cases when the 2-D sensor array is translated in both the X and Y directions without rotation. More specifically, the image processing and feature point comparison module 24 is configured to: (a) find X and Y pixel position values for feature points in the first and second scan images; (b) determine which feature points found in step (a) are common feature points in the first and second scan images; (c) computing pixel position differences between the common feature points appearing in the first and second scan images; (d) calculate the second Y position coordinate of the reference point RP at the second position on the surface of the target object by adding the product $\Delta R \Box f_{cal}$ to the first Y position coordinate; and (e) calculate a second X position coordinate of the reference point RP at the second position on the surface of the target object by adding the product $\Delta C \Box f_{cal}$ to the first X position coordinate, where $\Delta C$ is a second pixel offset equal to a number of pixel columns of the sensor array by which the position of the common feature point in the second scan image is offset from the position of the common feature point in the first scan image. (For the purpose of illustration, it has been assumed that the calibration scale factors are the same for the rows and columns of the 2-D sensor array.)

FIGS. 5A through 5J are diagrams representing respective three-dimensional views of a 2-D NDI scanner 14 at respective positions during scanning of an area on the surface of a target object 3. In accordance with the proposed application depicted in FIGS. 5A-5J, the target object 3 is a stiffened fuselage section that includes a fuselage skin 9 and a plurality of stiffeners 5 attached to the fuselage skin 9 by means of respective rows of spaced fasteners 1 having respective structural features suitable for producing detectable edges in a scan image.

FIGS. 6A through 6J are diagrams representing stages in the construction of a composite scan image 30 respectively corresponding to the scanning positions of the 2-D NDI scanner 14 depicted in FIGS. 5A through 5J respectively. The composite scan image includes features 44 having edges representing the structural features of the fasteners 1.

FIGS. 7A through 7J are diagrams showing respective CAD model representations 32 consisting of 3-D CAD model data flattened to two dimensions. The CAD model representation 32 includes structural information from an area of the stiffened fuselage section having respective dashed rectangles 28 superimposed at positions corresponding to the scanning positions of the 2-D NDI scanner 14 depicted in FIGS. 5A through 5J respectively. The CAD model representation 32 includes pixels 34 in states representing the fuselage skin 9, pixels 36 in states representing the stiffeners 5 and pixels 38 in states representing the fasteners 1, all of the representations of structural components being positioned in accordance with the CAD model specifications.

Figure 7A:
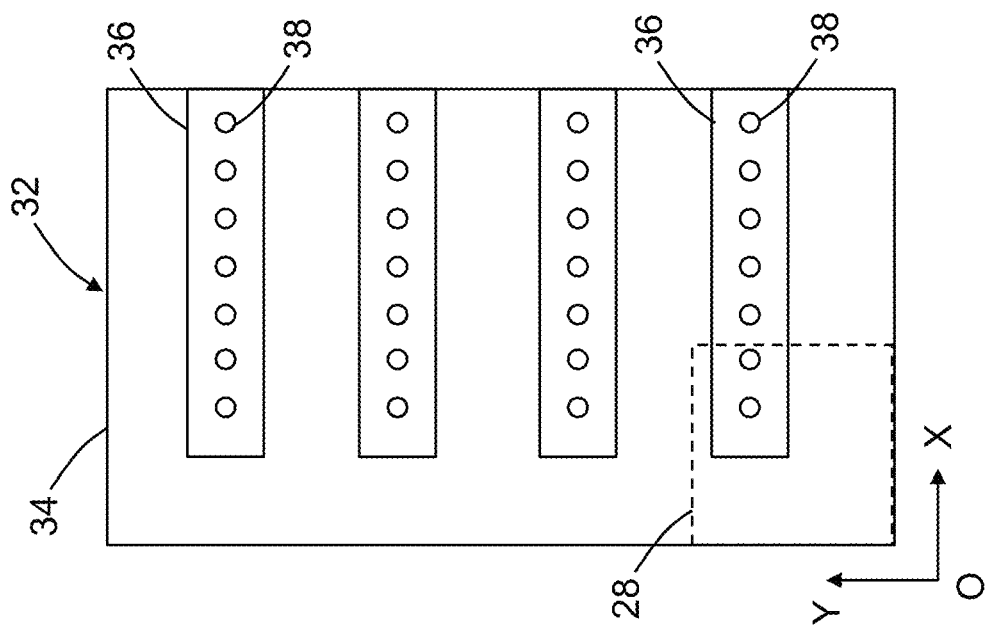
FIGS. 7A through 7J are diagrams representing respective two-dimensional CAD model images of an area of the stiffened fuselage section having respective rectangles superimposed at positions corresponding to the scanning positions depicted in FIGS. 5A through 5J respectively.
Figure 6A:
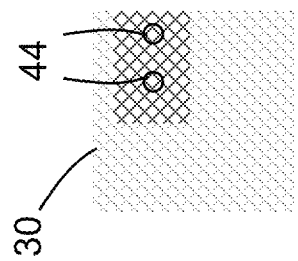
FIGS. 6A through 6J are diagrams representing stages in the construction of a composite scan image respectively corresponding to the scanning positions depicted in FIGS. 5A through 5J respectively.
Figure 5A:
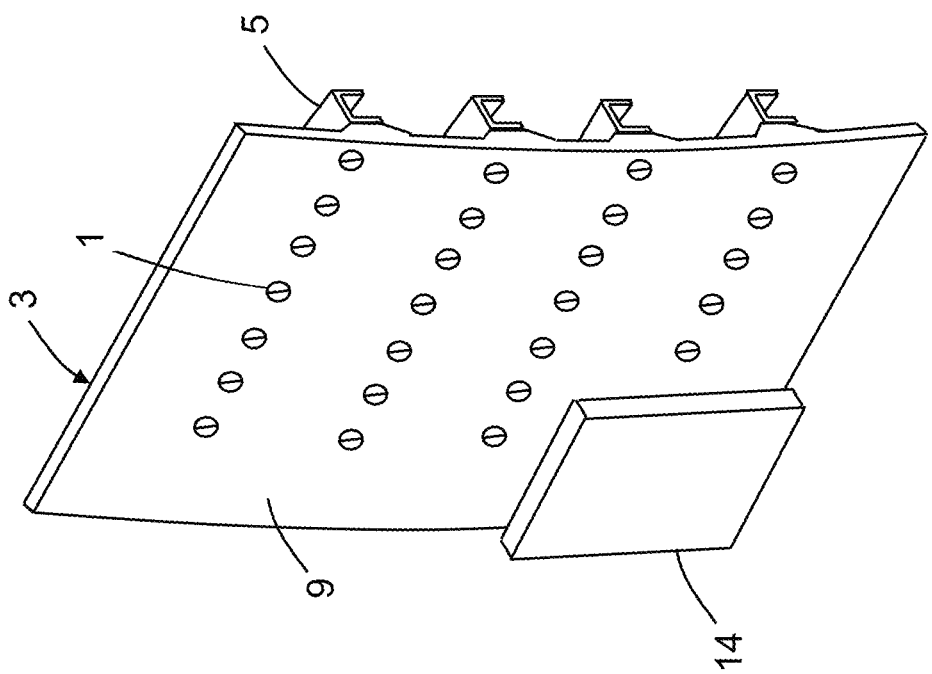
FIGS. 5A through 5J are diagrams representing respective three-dimensional views of a two-dimensional array of sensors at respective positions during scanning of an area of a stiffened fuselage section in accordance with one proposed implementation.
Figure 7B:
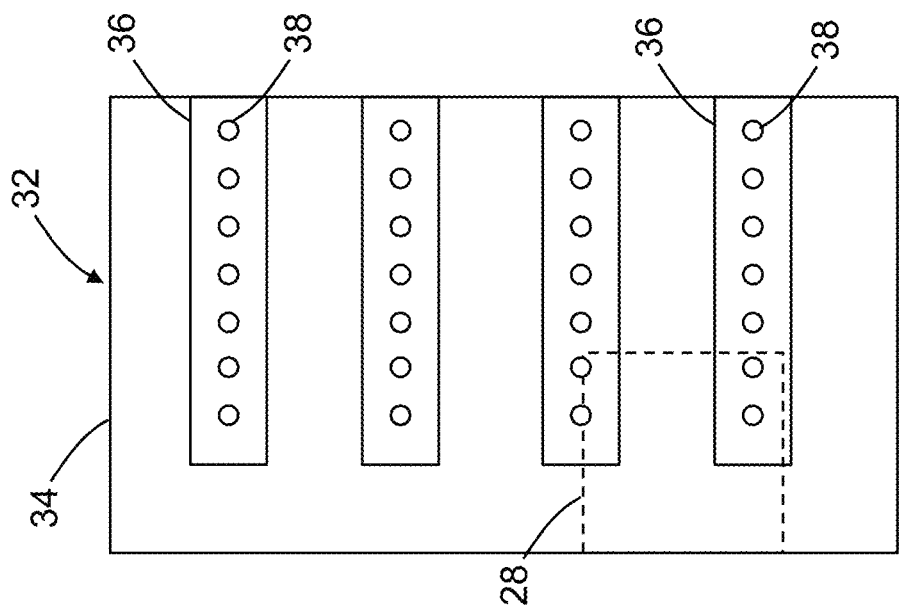
Figure 5B:
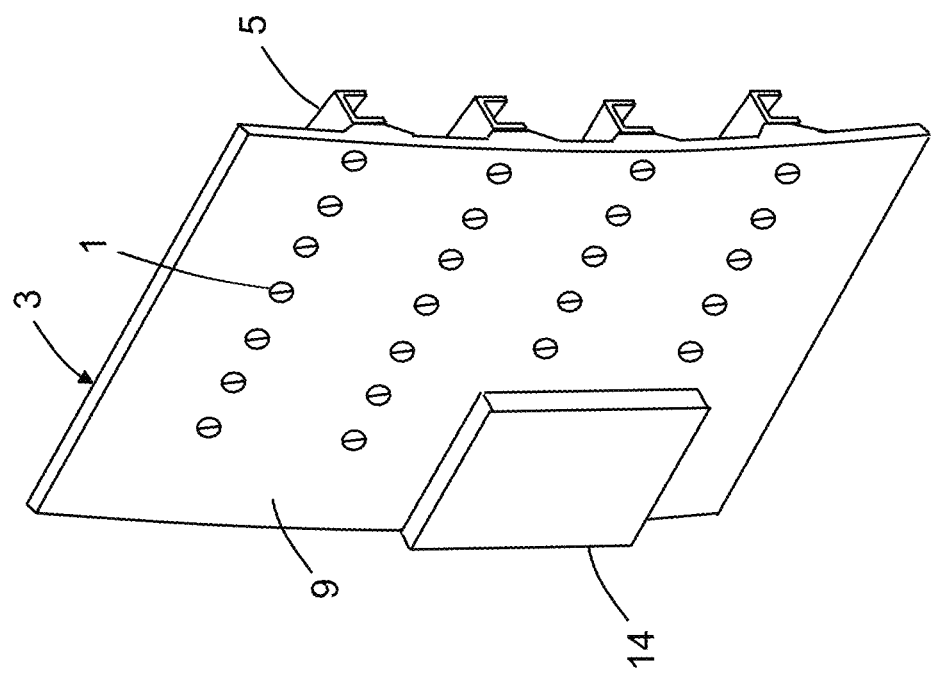
Figure 7C:
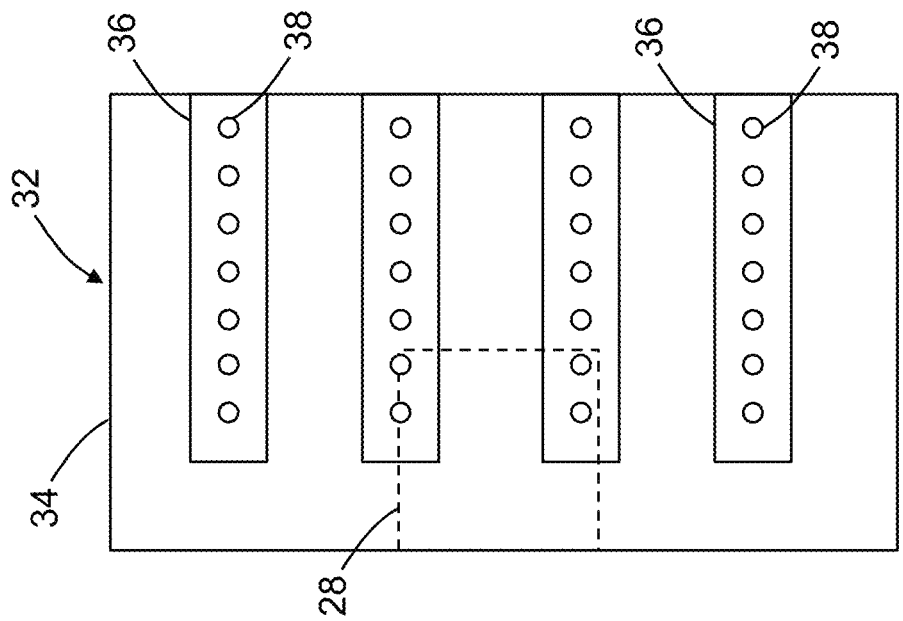
Figure 5C:
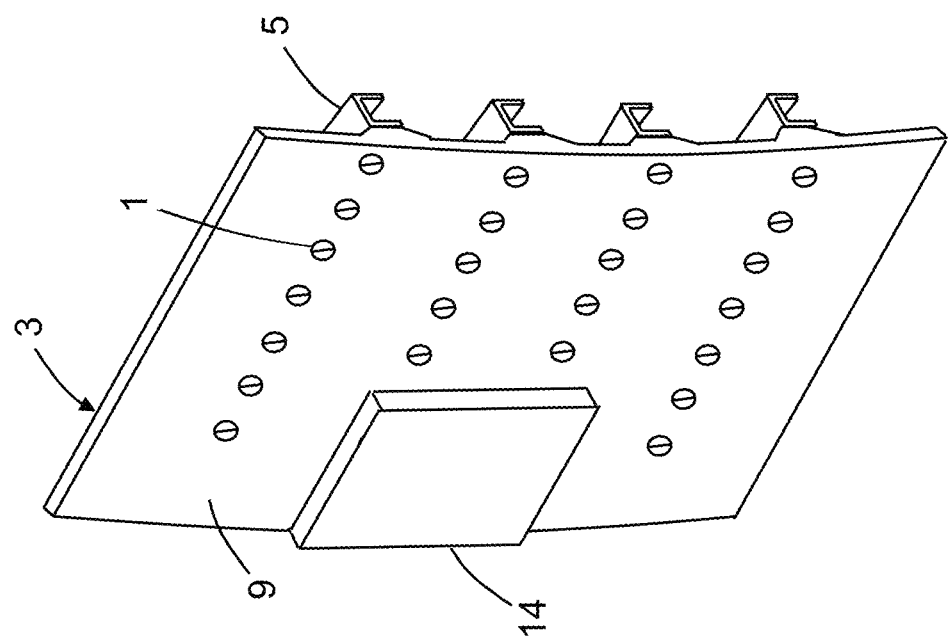
Figure 7D:
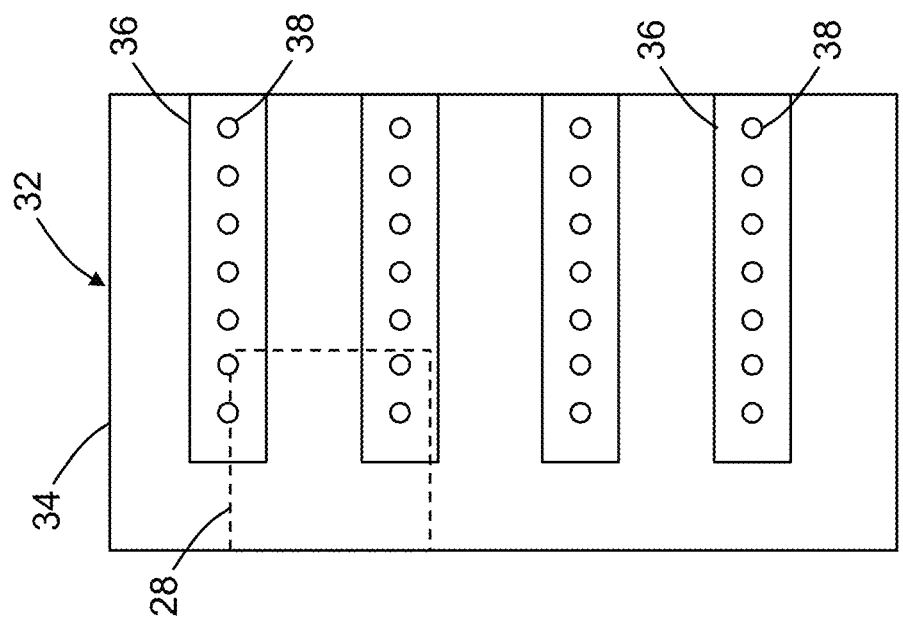
Figure 5D:
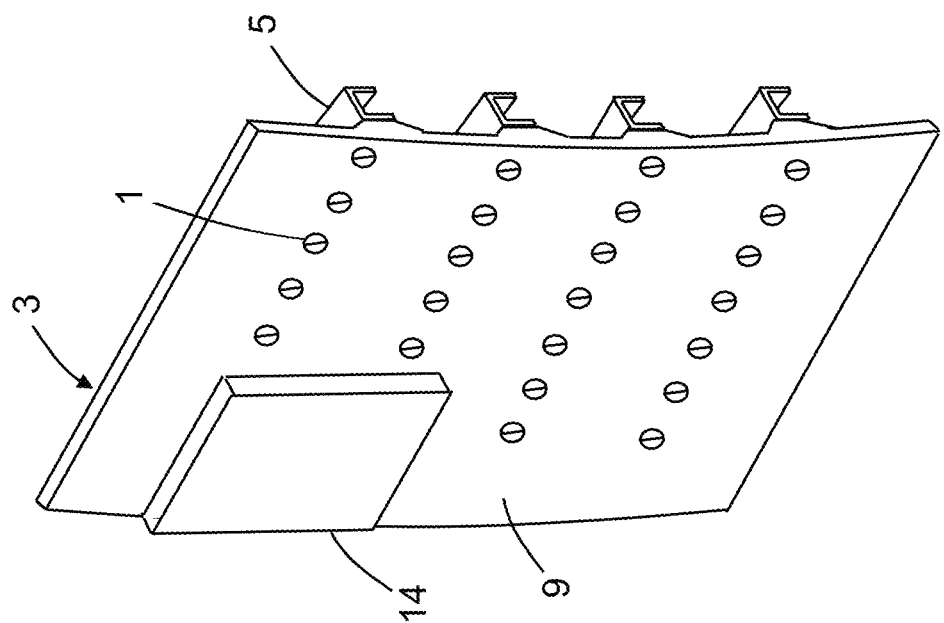
Figure 7E:
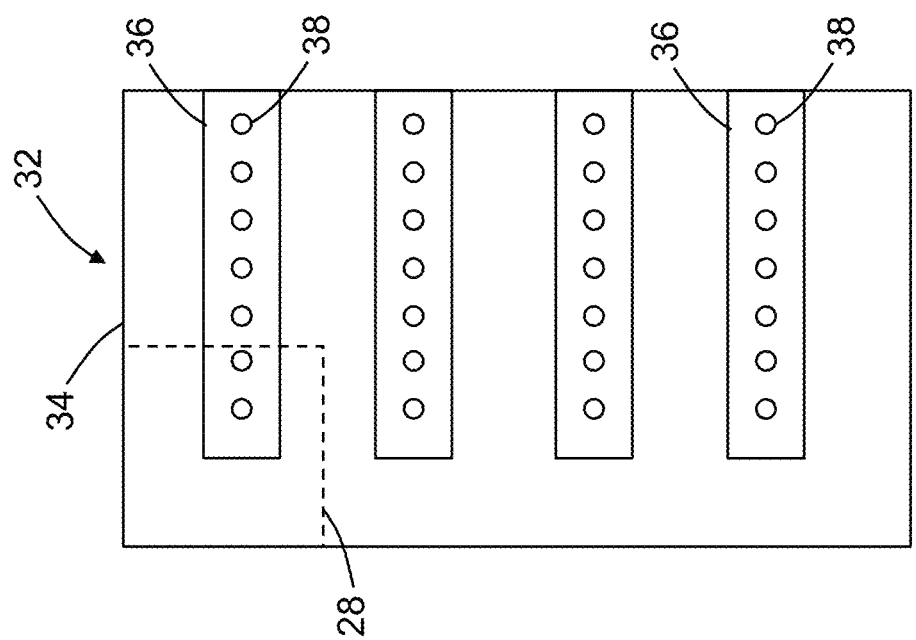
Figure 5E:
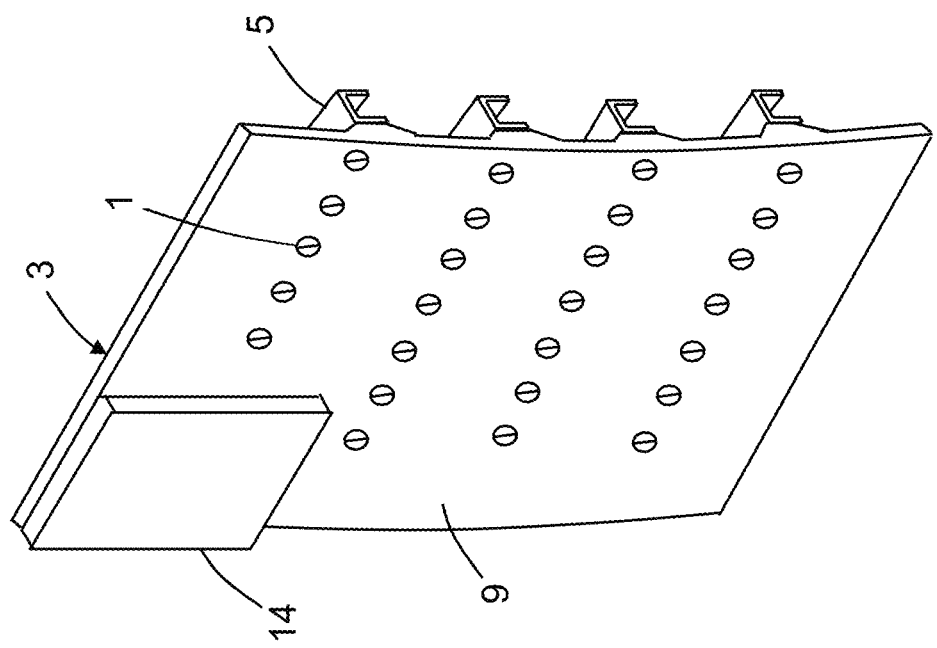
Figure 7F:
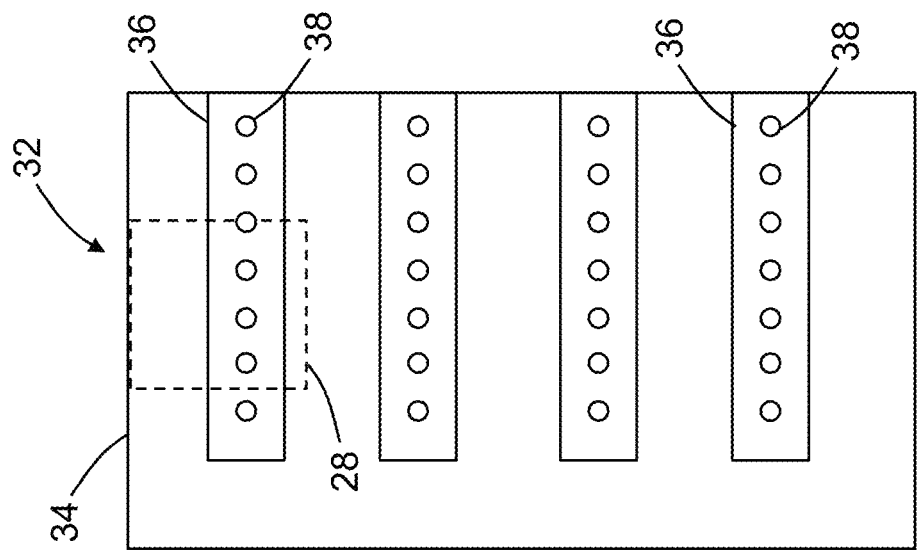

FIG. 5A shows the NDI scanner 14 at an initial location where the position coordinates (in the frame of reference of the target object 3) of a reference point (not shown) on the NDI scanner 14 are known. An initial scan image 30, initially consisting of only a single scan image acquired while the NDI scanner 14 is at the location depicted in FIG. 5A, is shown in FIG. 6A, As seen in FIG. 6A, two features 44 appear in initial scan image 30, which features correspond to respective fasteners 1 within the scan (coverage) area of the NDI scanner 14 at the location depicted in FIG. 5A. The dashed rectangle 28 in FIG. 7A is superimposed on the CAD model representation 32 to indicate the absolute location of the NDI scanner 14 in the frame of reference of the target object 3, which frame of reference is indicated by X and Y axes intersecting at an origin O in FIG. 7A.

For the respective locations along an exemplary scan path partly depicted in FIGS. 5B through 5E, the NDI scanner 14 is translated vertically (parallel to the Y axis) upward a set distance multiple times, stopping after each move to acquire a new scan image. The set distance is less than the height of the 2-D sensor array of the NDI scanner 14, thereby ensuring that successive scan images will overlap a common area on the surface of the target object 3. The set distance by which the NDI scanner 14 advances is selected so that successive scan images will include common features corresponding to fasteners 1. In the example depicted in FIGS. 5A-5J, the height of the 2-D sensor array of the NDI scanner 14 is greater than the distance between adjacent rows of fasteners 1. Using the localization process described above, the respective absolute locations of NDI scanner 14 (corresponding to the locations depicted in FIGS. 5B through 5E) in the frame of reference of the target object 3 may be estimated and then optionally displayed on the CAD model representation 32, as seen in FIGS. 7B through 7E. In addition, the respective scan images acquired while the NDI scanner 14 is located as shown in FIGS. 5B through 5E are successively stitched to progressively construct the composite scan images 30 seen in FIGS. 6B through 6E.

Figure 6B:
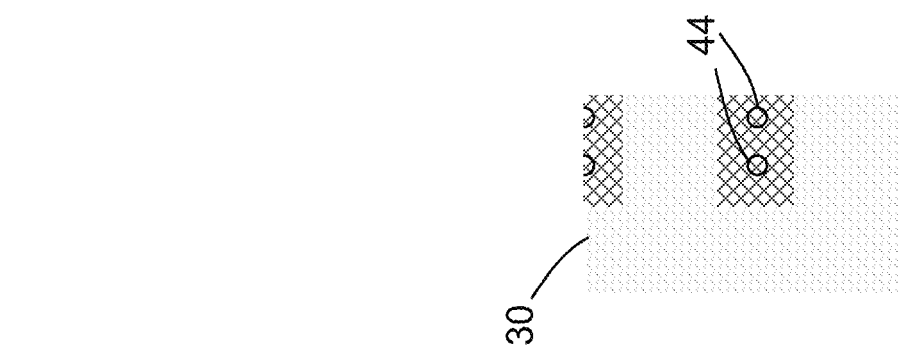
Figure 6C:
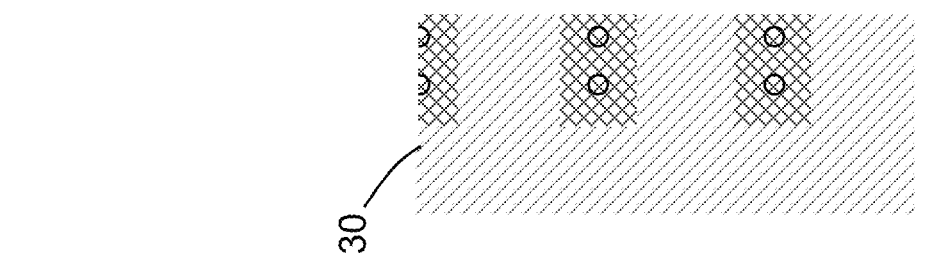
Figure 6D:
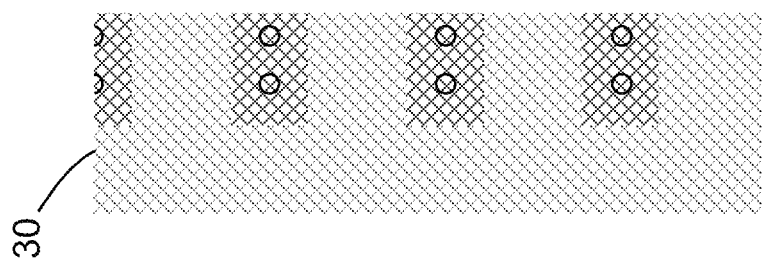
Figure 6E:
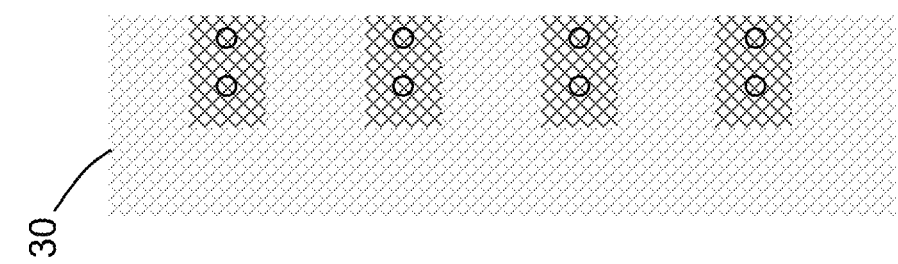
Figure 6F:
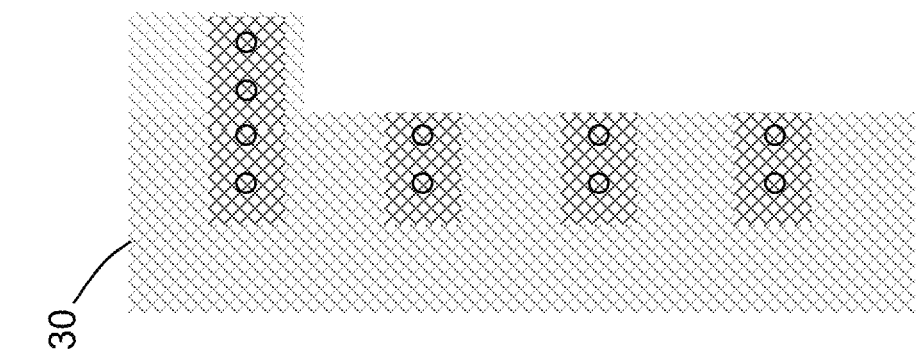
Figure 5F:
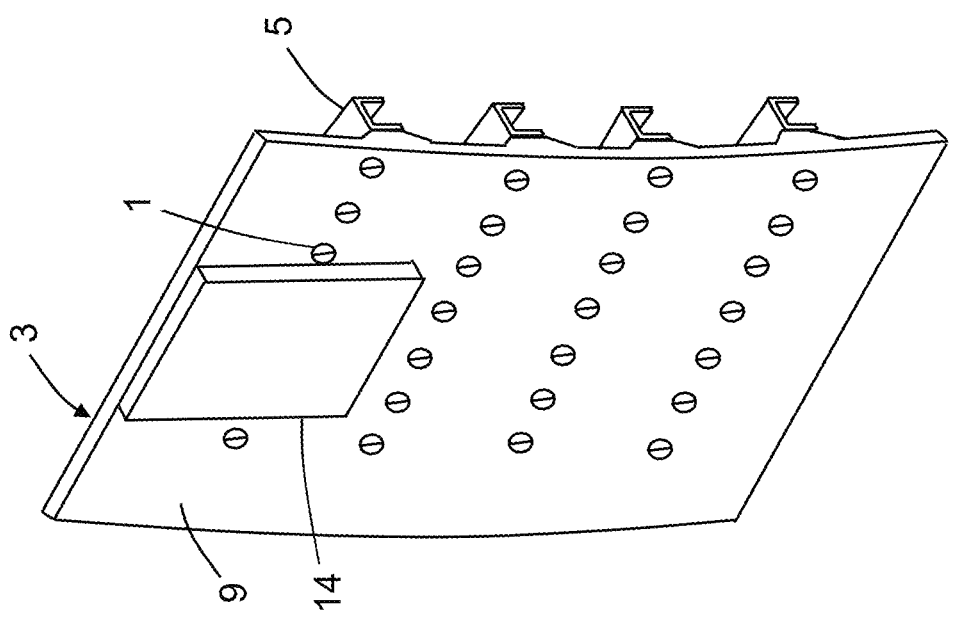
Figure 7G:
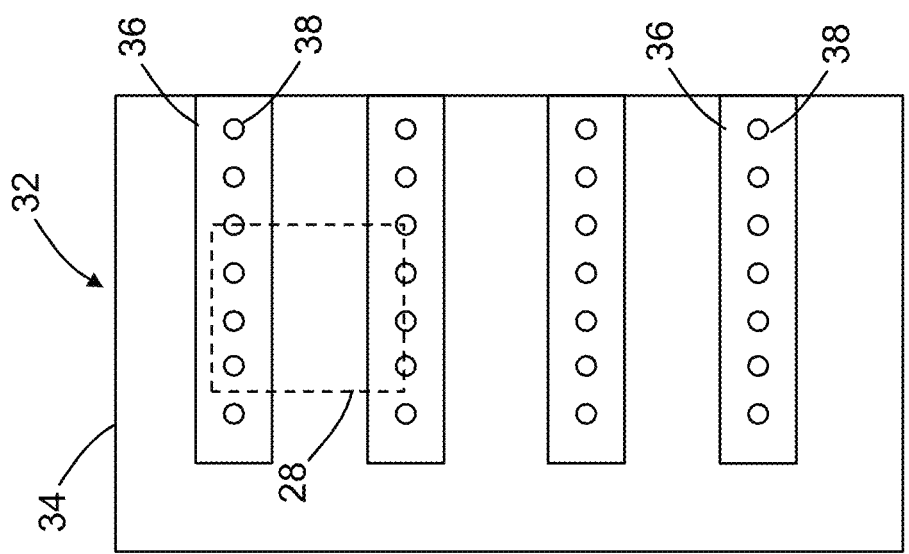
Figure 6G:
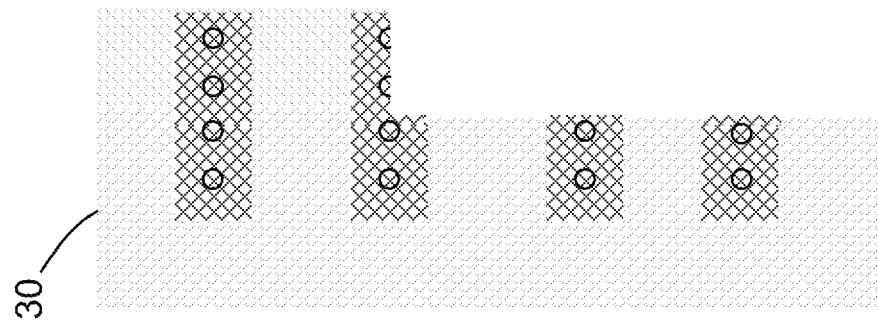
Figure 5G:
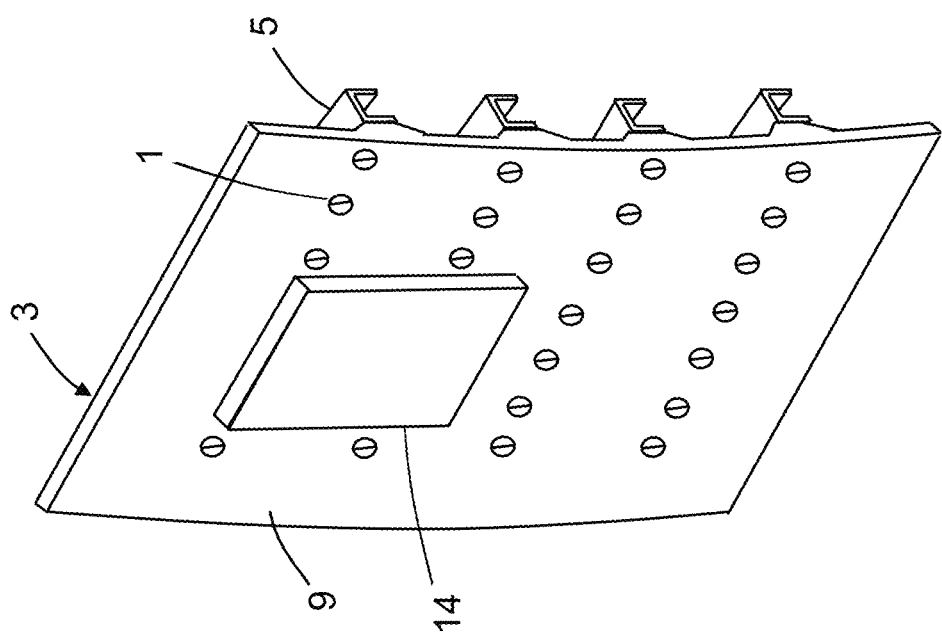
Figure 7H:
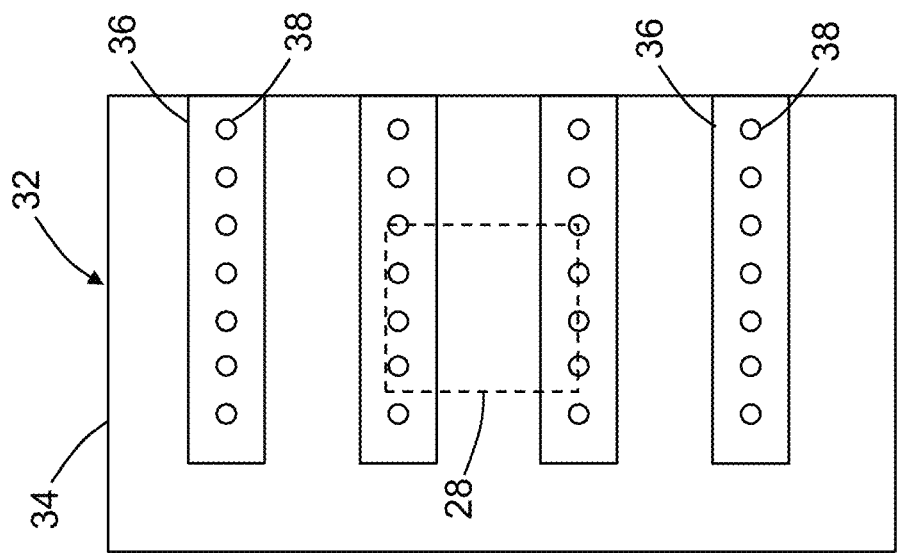
Figure 6H:
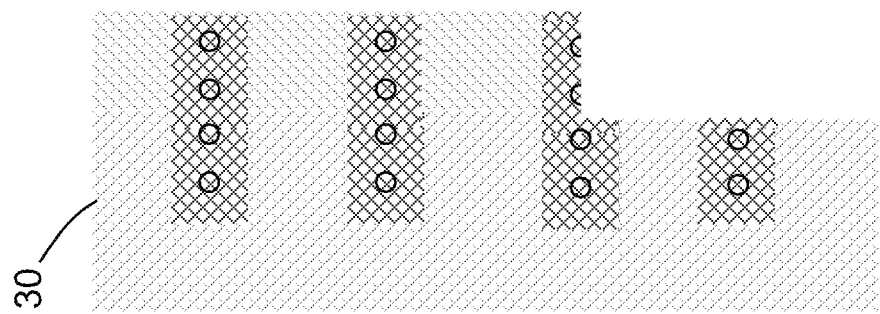
Figure 5H:
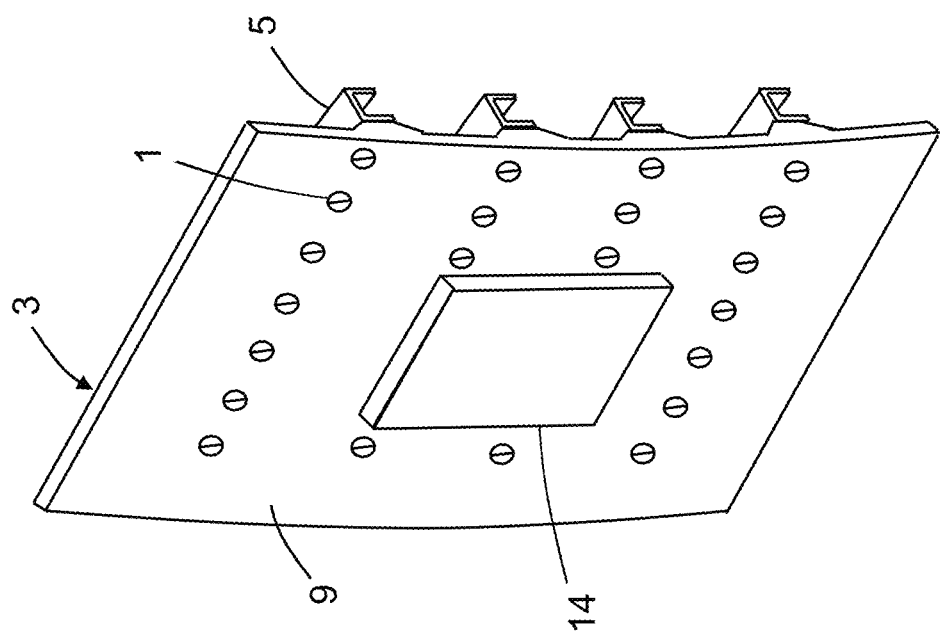
Figure 7I:
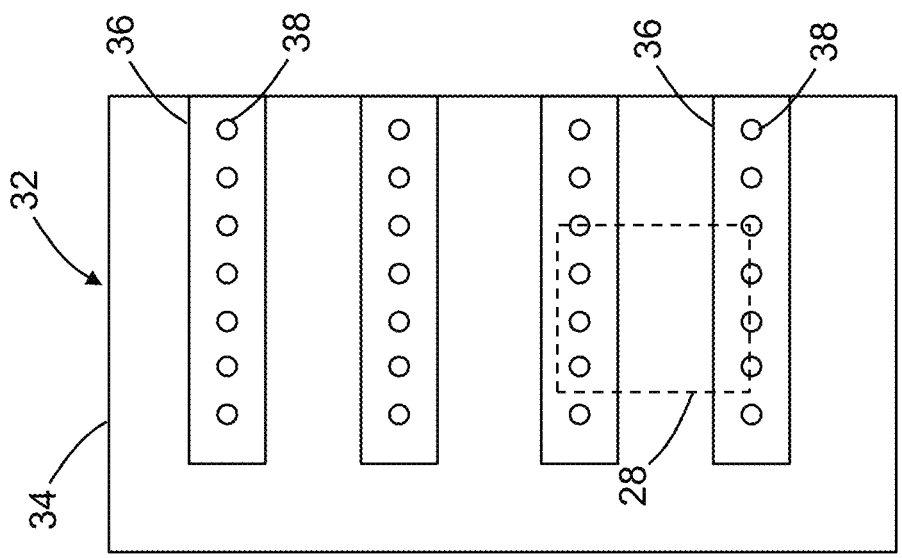
Figure 6I:
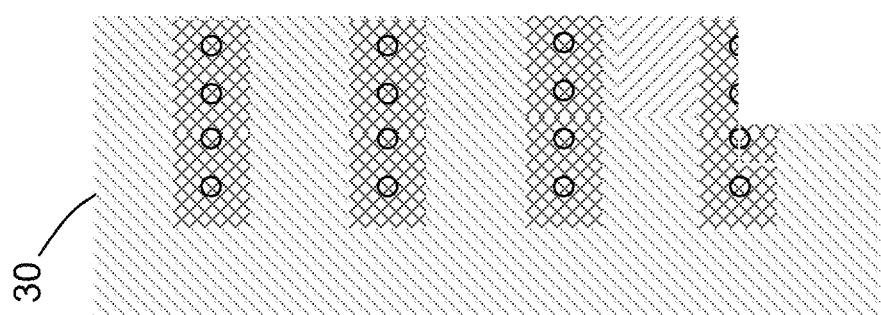
Figure 5I:
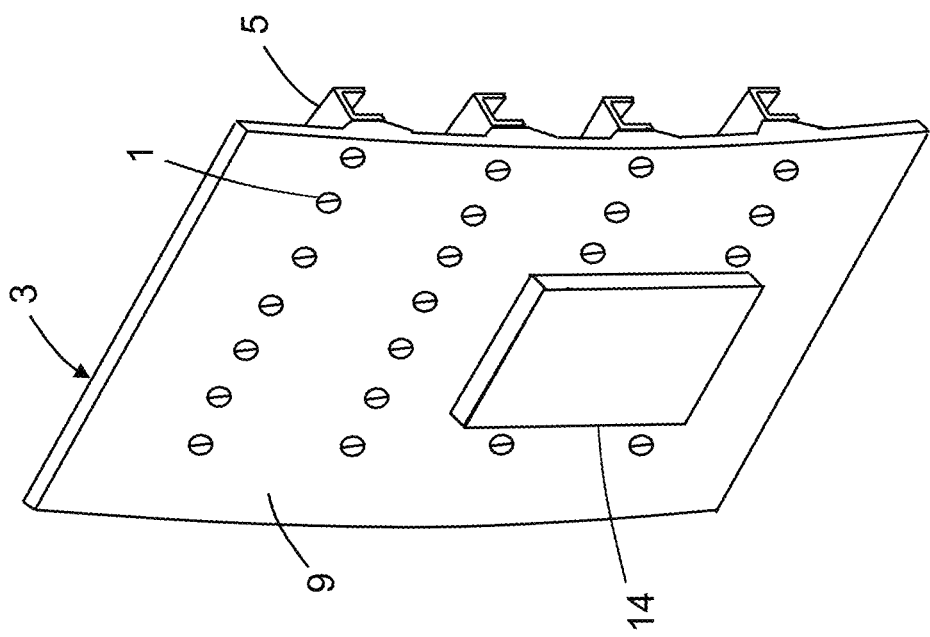
Figure 7J:
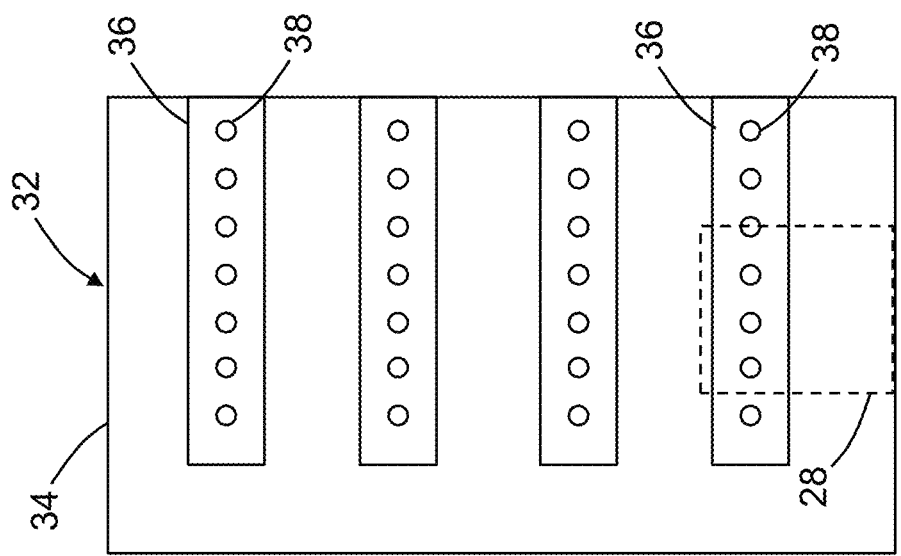
Figure 6J:
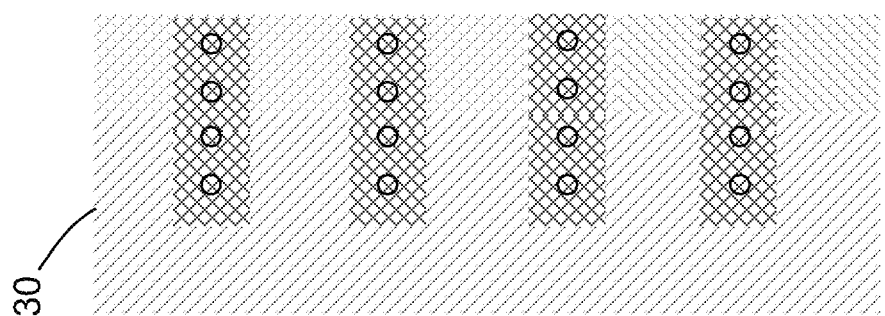
Figure 5J:
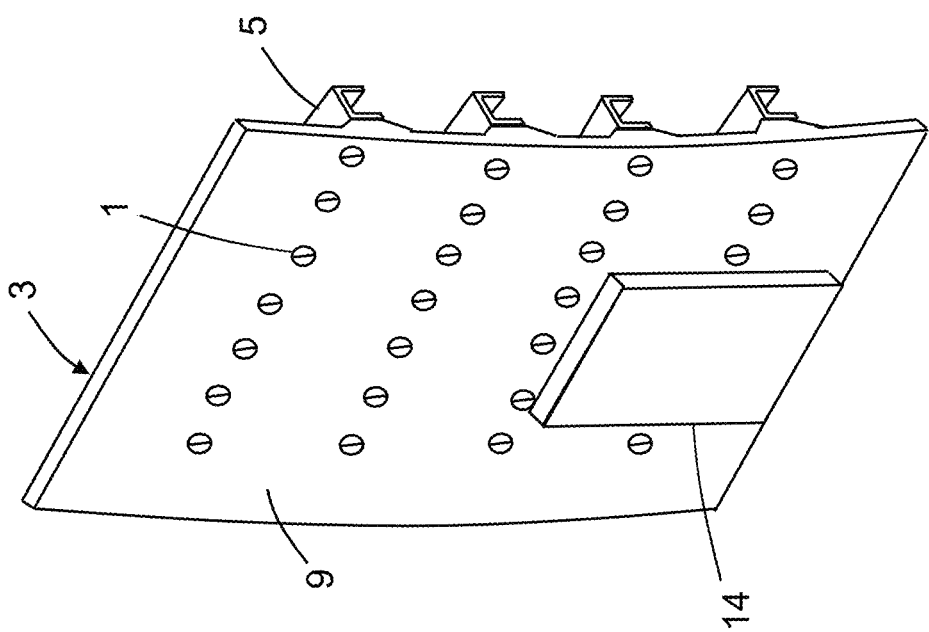

As shown in FIG. 5F, upon completion of the vertical translation sequence, the next move is a lateral (horizontal) translation by a set distance less than the width of the 2-D sensor array. The absolute location of the NDI scanner 14 in the frame of reference of the target object 3 at this stage is indicated by dashed rectangle 28 in FIG. 7F. FIG. 6F shows the composite scan image 30 after the scan image acquired in the stage depicted in FIG. 5F has been added by stitching.

For the respective locations along an exemplary scan path partly depicted in FIGS. 5G through 5J, the NDI scanner 14 is translated vertically downward the set distance multiple times, stopping after each move to acquire a new scan image. Again, successive scan images overlap a common area on the surface of the target object 3. Using the localization process described above, the respective absolute locations of NDI scanner 14 (corresponding to the locations depicted in FIGS. 5G through 5J) in the frame of reference of the target object 3 may be estimated and then displayed on the CAD model representations 32, as seen in FIGS. 7G through 7J. In addition, the respective scan images acquired while the NDI scanner 14 is located as shown in FIGS. 5G through 5J are successively stitched to progressively construct the composite scan images 30 seen in FIGS. 6G through 6J.

An automated motion platform can be programmed to travel over a surface of a structure on a pre-defined path. The location of the automated motion platform can be tied to the coordinate system of the target object, e.g., an aircraft, and therefore can be programmed to follow the internal structure for the purposes of inspection. After the NDI scan data has been collected, features from a CAD model of the aircraft are correlated with the NDI scan data for the most accurate depiction of the substructure. Since the location information of the inspection area (defined in the coordinate system of the aircraft) is known, that location information can be used to position and orient the 2-D image in the same visualization environment as a CAD model showing aircraft features, which model is defined in the same reference coordinate system. This can be accomplished as an overlay or side-by-side display. In an overlay display scenario, the 2-D NDI scan image is represented as a semi-transparent texture map that allows the CAD model features to be seen through the 2-D scan image. Based on observation and analysis of the overlay display, an inspector decides whether a repair is needed or not. A process for correlating features from a CAD model of the aircraft with the NDI scan data is described in U.S. Pat. No. 9,182,487. After the features from the CAD model of the aircraft have been correlated with the NDI scan data to produce an accurate depiction of the features hidden under a skin of the aircraft, the location of features to be marked for repair can be selected manually or automatically using the 2-D scan and CAD images.

FIGS. 8A through 8D are diagrams representing respective paths for scanning a surface area of an example target object 3'. The dashed arrows indicates scan path segments followed by the reference point (or other point having a known position relative to the reference point) of the 2-D sensor array of an NDI scanner. Adjacent scan path segments are overlapped and the resulting scan image data is stitched together to form a composite scan image.

Figure 8A:
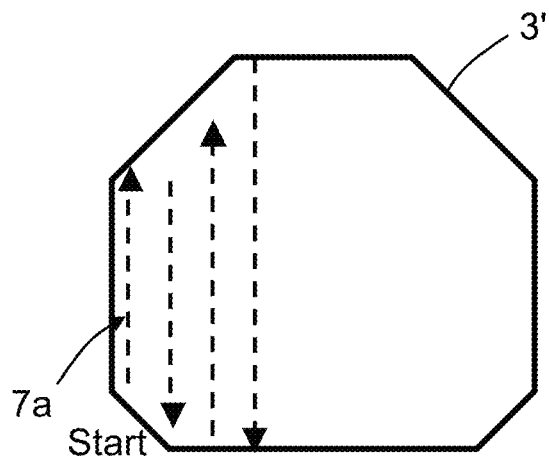
FIGS. 8A through 8D are diagrams representing respective paths for scanning a surface area of an example target object.

FIG. 8A shows an edge-start side-to-side scanning method in which the NDI scanner follows a scan path 7a indicated by dashed arrows. In accordance with one proposed implementation, the edge-start side-to-side scanning method includes the following steps: (a) The NDI scanner starts scanning at the beginning of one edge (like a corner of two adjacent edges) and then moves along that edge until a traversing far edge is reached. (The one edge may not be linear.) (b) The NDI scanner is then moved away from the previous scan line by a portion of the sensor array width. (c) The NDI scanner than scans back in the opposite direction until the traversing edge is reached, using a selected overlap as the guide to position. (d) Repeat steps (b) and (c) until the entire area is covered (i.e., the far edge opposite the original (near) edge is reached). (e) An optional path around the entire edge may be followed to ensure that the edge is fully covered.

Figure 8B:
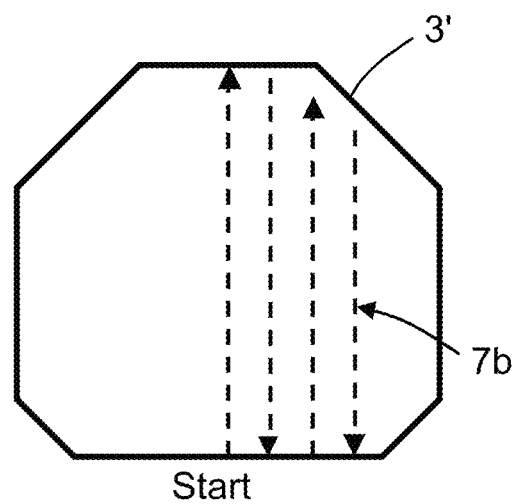

FIG. 8B shows an edge-start center-to-side scanning method in which the NDI scanner follows a scan path 7b indicated by dashed arrows. In accordance with one proposed implementation, the edge-start center-to-side scanning method includes the following steps: (a) Starting from one edge, move the NDI scanner away from that one edge across the surface and travel along a generally linear path until the traversing far edge is reached. (b) The NDI scanner than scans back in the opposite direction until the traversing edge is reached, using a selected overlap as the guide to position the NDI scanner. (c) Repeat step (b) until the entire area on one side of the original scan line is covered. (d) Move the NDI scanner to the other side of the original scan line, selecting a start point at either edge. (e) Repeat step (b) on that side of the original scan line until the entire area is covered. (f) An optional path around the entire edge may be followed to ensure that the edge is fully covered.

Figure 8C:
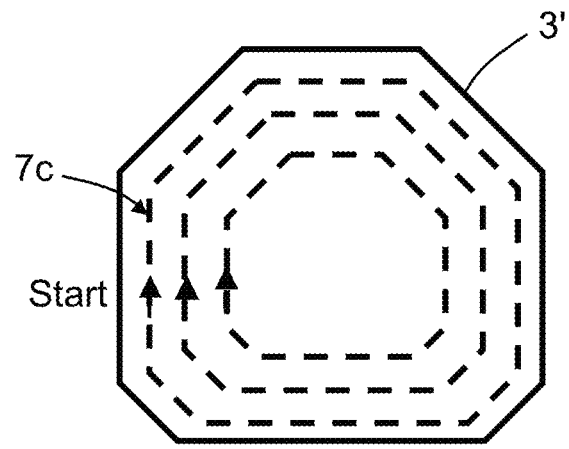

FIG. 8C shows an outside-to-inside scanning method in which the NDI scanner follows a scan path 7c indicated by dashed arrows. In accordance with one proposed implementation, the outside-to-inside scanning method includes the following steps: (a) Starting at one edge, move the NDI scanner along that edge in either direction until a complete circumnavigation has been achieved. (b) Move the NDI scanner away from the edge scan strip a pre-selected proportion of the array width. (c) Scan all the way around the inside of the edge scan strip, maintaining scan strip overlap. (d) Repeat steps (b) and (c) until the entire area of the surface has been scanned.

Figure 8D:
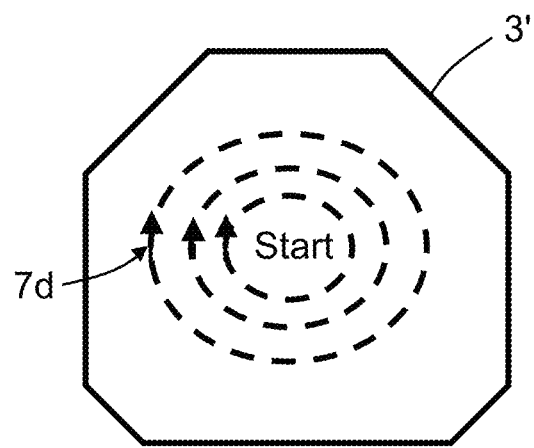

FIG. 8D shows an inside-to-outside scanning method in which the NDI scanner follows a scan path 7d indicated by dashed arrows. In accordance with one proposed implementation, the inside-to-outside scanning method includes the following steps: (a) To start, place the NDI scanner somewhere in the middle of the surface to be scanned. (b) Move the NDI scanner along a closed path scan (returning to the scan start point) that is small enough to not leave any gap in the center (longest axis of the area will be shorter than the array width). The closed path can be circular, oval, square, or some other shape, including one that approximates the shape of the outer edge of the area. (c) Move the NDI scanner away from the scan strip a pre-selected proportion of the array width. (d) Scan all the way around the outside of the previous scan strip, while maintaining scan strip overlap, until the NDI scanner is back at the path start. (e) If an edge is reached, scan along the edge in the same direction of the closed path being followed until the point when NDI scanner is able to continue with the path that uses the selected overlap as the guide. (f) Repeat steps (c) through (e) until one full path around the entire edge is the default scan.

Figure 9:
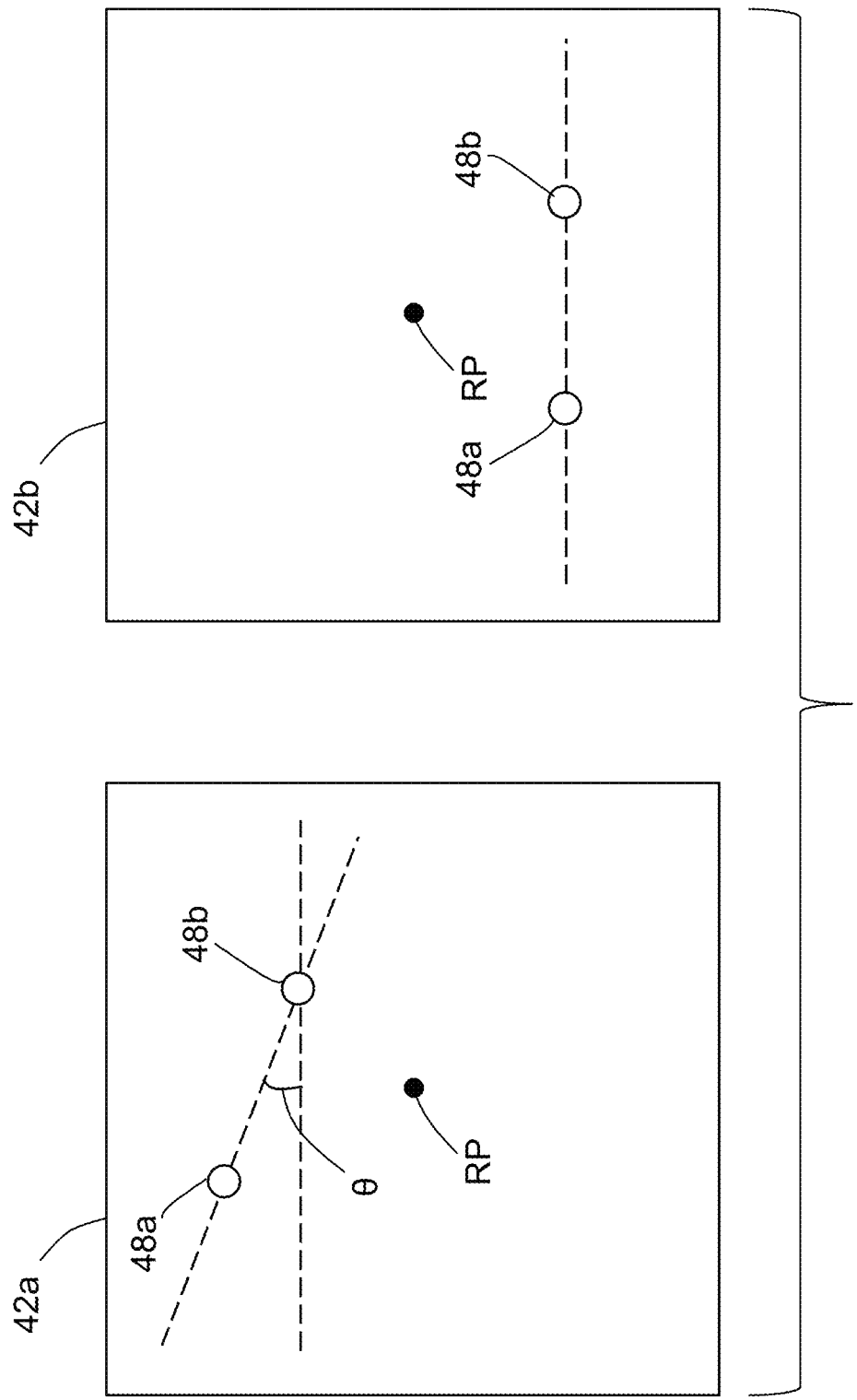
FIG. 9 is a diagram showing the positions of two common features in respective scan images acquired in succession at respective differently oriented locations using a two-dimensional sensor array having sensors arranged in rows and columns.

The localization methodology proposed herein is also effective in cases wherein translation of the NDI scanner in the interval between successive scans is accompanied by rotation. FIG. 9 is a diagram showing the positions of two common feature points 48a and 48b in respective scan images 42a and 42b acquired in succession while an NDI scanner is at respective differently oriented locations. As used herein, the phrase "differently oriented" means that the 2-D sensor array of the NDI scanner 14 has different orientations at the respective locations. For the purpose of illustration, it is assumed hereinafter that the NDI had a first orientation angle when the first scan image 42a was captured and a second orientation angle, which differs from the first orientation angle by angle $\theta$, when the second scan image 42b was captured. In this example, the NDI scanner includes a multiplicity of sensors arranged in rows and columns and having a reference point RP at a known location with respect to the 2-D sensor array. This example assumes that the motion platform 12 is controlled so that the 2-D sensor array was rotated relative to the angular position at which the first scan image 42a was captured. The rotation angle $\theta$ may be calculated by using SLAM or other localization technique.

In accordance with one embodiment, the method for tracking a location of a scanner comprises the following steps. (a) The 2-D sensor array is placed adjacent to a surface and overlying first and second features of a target object and is oriented at a first orientation angle which is known. (b) While oriented at the first orientation angle, the scanner acquires a first set of sensor data from a confronting first portion of the target object. (c) The first set of sensor data is converted to first scan image data of a first scan image. (d) Then the scanner is re-oriented so that the sensor array has a second orientation angle different than the first orientation angle, but again overlies the first and second structural features. (e) While oriented at the second orientation angle, the scanner acquires a second set of sensor data from a confronting second portion of the target object. (f) The second set of sensor data is converted to second scan image data of a second scan image. (g) The image processing and feature point comparison module 24 finds X and Y pixel position values for feature points in the first and second scan images. (h) The image processing and feature point comparison module 24 determines which feature points found in step (g) are common feature points in the first and second scan images. (i) The image processing and feature point comparison module 24 computes pixel position differences between the common feature points appearing in the first and second scan images. (j) The image processing and feature point comparison module 24 then calculates the second orientation angle based at least partly on the first orientation angle and a difference of a first angle of a first line connecting respective positions of the first and second common feature points in the first scan image and a second angle of a second line connecting respective positions of the first and second common feature points in the second scan image. In the example depicted in FIG. 9, the difference of the first and second angles is angle θ.

In accordance with one proposed implementation, step (i) includes (1) calculating a first pixel offset equal to a number of pixel rows by which the position of the second common feature point in the first scan image is offset from the position of the first common feature point in the first scan image; (2) calculating a second pixel offset equal to a number of pixel columns by which the position of the second common feature point in the first scan image is offset from the position of the first common feature point in the first scan image; (3) calculating a third pixel offset equal to a number of pixel rows by which the position of the second common feature point in the second scan image is offset from the position of the first common feature point in the second scan image; and (4) calculating a fourth pixel offset equal to a number of pixel columns by which the position of the second common feature point in the second scan image is offset from the position of the first common feature point in the second scan image, wherein the first angle has a tangent equal to a ratio of the first pixel offset to the second pixel offset and the second angle has a tangent equal to a ratio of the third pixel offset to the fourth pixel offset. To calculate the absolute location of the NDI scanner in the frame of reference of the surface of the target object, the system described above combines relative position and orientation data with prior (old) absolute position and orientation data to compute the current (new) absolute position and orientation of the NDI scanner with respect to the target object's coordinate system. This localization methodology is a dead reckoning process, which means that as more discrete relative distance values are summed, the absolute location estimate becomes less accurate. An optional correction process may be used along with the basic relative localization process to improve the location estimate based on knowledge of identified common features within the scan image whose position coordinates are known. This correction process, running at a lower update rate than the primary feature tracking process, can be used to improve the location estimate to compensate for feature compounding measurement errors.

In accordance with some embodiments, the localization method includes periodic correction steps to relocate the 2-D sensor array, such as occasional manual checks and manual corrections of position and orientation. For example, the array scans the length of the part, moves over less than the width of the array, and then scans back to the original edge in a manner similar to what is shown in FIGS. 5A-5J. The distance from the start position can be checked and adjusted after each scan pass, or after several passes, as can the array angle.

In the case of a robot crawler vehicle, wheel slippage in the path direction will become obvious as the NDI scanner travels across structural features of the target object. The position and orientation between scans could be checked with a distance measurement to the start point and simple laser line alignment adjustment to the start position. If there is a random or non-repeating pattern, the position and orientation of the array can be checked with each overlapping pass, and be corrected manually using the known reference features scanned on the target object, whenever there is significant divergence.

As previously described with reference to FIG. 1, the composite scan image 30 (shown at various stages in FIGS. 6A-6J) is constructed by the NDI sensor data processor 20 based on relative location data 26 generated by the image processing and feature point comparison module 24. Alignment of the stitched together images uses relative pixel offsets for the alignment and does not involve absolute position coordinates—but for physical tracking, an absolute distance may be computed. Knowing the number of pixels alone does not enable the system to determine exactly how long a structural feature is. The localization process proposed herein is an approximation that will "drift" increasingly over time, until one is able to update the location estimate with known absolute coordinate information, at which point the error drops back to zero, and starts building up again as more image alignments are processed.

For example, one may generate a composite scan image with twenty images stitched together with no apparent misalignment, but the overall length of the image in pixels might not correspond exactly to the physical distance traveled in inches or centimeters. This is because the assembled image may be slightly warped due to small alignment errors from one image to the next. A pixel is a digital representation of the analog world, but round-off, truncation, or other measurement artifacts creep into the mix from the analog-to-digital conversion. Even though the distance between adjacent and adjacent columns of elements making up the 2-D sensor array is known, small errors will build up in the overall distance summation as more and more images are aligned, unless or until the estimated absolute location is corrected using a known absolute reference. The overall image-to-image error may be small and one may be able to capture multiple images between known landmark updates, but at some point the measured distance error may grow too large, thereby inviting correction as disclosed herein.

In accordance with a further aspect, if an accurately scaled composite scan image is desired, one may scale the composite scan image to the proper size afterward if the actual overall distance is known from other landmark data. It may also be appreciated that it is not always the case that a composite scan image would need to be stored in memory. That would be the case only when a composite scan image is useful for some type of analysis process (such as NDI analysis). In other situations, the scan image data may be stored in memory only for location tracking purposes, and the localization process will delete individual images from memory when they are no longer needed for feature alignment.

The 2-D NDI sensor-based localization process proposed herein is applicable to automated motion control systems using feedback control (such as robots and surface-crawling vehicles), as well as to manual motion control systems (such as hand-held devices).

For manual movement of a 2-D NDI scanner, there are several options: (1) to slide the 2-D NDI scanner over the surface, the support housing for the 2-D NDI scanner may be made of some type of low-friction plastic (such as Delrin) to reduce sliding resistance and potential scratching of the surface; or (2) a support frame for the 2-D NDI scanner may be provided with three or more omnidirectional wheels (hereinafter "omni wheels").

For automated movement, an NDI scanner may be mounted to the frame of a crawler vehicle (e.g., a holonomic-motion or non-holonomic-motion crawler vehicle). For example, a tethered crawler vehicle capable of scanning a two-dimensional sensor array on a surface of a fuselage is disclosed in U.S. Pat. No. 8,738,226. In alternative embodiments, the two-dimensional sensor array may be mounted to vacuum-adhering crawler vehicles of the types disclosed in U.S. Pat. Nos. 8,738,226 and 10,168,287. Automated movement may alternatively be achieved by mounting an NDI scanner to a frame assembly that is coupled to an end effector at the distal end of a manipulator arm (articulated, telescopic, gantry, etc.). (As used herein, the term "end effector" means the last link of an automated apparatus comprising an arm, at which endpoint a frame assembly that supports an NDI scanner is coupled.) A suitable robot comprising an articulated arm is disclosed in U.S. Pat. No. 9,933,396. In accordance with an alternative automated system, the NDI scanner may be carried by an unmanned aerial vehicle (UAV) that flies to the target area and then drags a sensor array over the surface of the target area. For example, U.S. patent application Ser. No. 16/202,347 discloses a UAV which carries a one-dimensional sensor array, but may be adapted to carry a two-dimensional sensor array.

Figure 10:
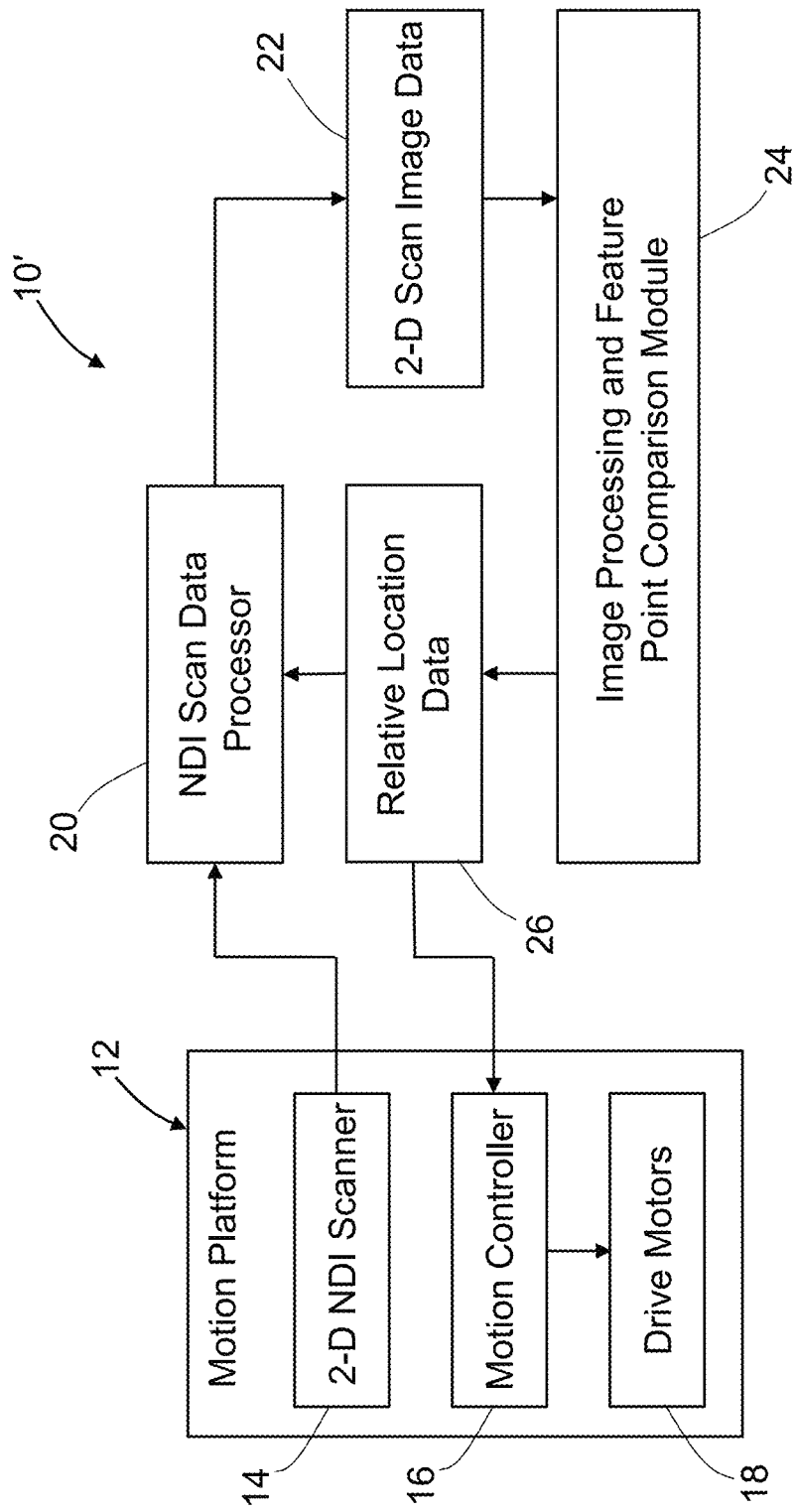
FIG. 10 is a diagram identifying some components of a system for tracking and navigating an automated motion platform equipped with an NDI scanner comprising a two-dimensional array of sensors in accordance with another embodiment.

FIG. 10 is a diagram identifying some components of a system 10' for tracking and navigating an automated motion platform 12 equipped with an NDI scanner 14, a motion controller 16 and drive motors 18 (for driving wheels not shown) in accordance with one embodiment. The motion controller 16 may include an onboard motion control processor or module and a multiplicity of motor controllers which receive commands from the motion control processor or module for controlling the operation of a multiplicity of drive motors 18 that drive rotation of wheels (e.g., omni or Mecanum wheels). During a scanning operation, the NDI scanner 14 is placed at successive locations on a surface of a target object as a result of successive movements of the motion platform 12. At each scan location, the NDI scanner 14 is activated to acquire sensor data from a respective confronting portion of the target object surface.

The system 10 partly depicted in FIG. 10 further includes an NDI sensor data processor 20 that is communicatively coupled (via cables or wirelessly) to the NDI scanner 14. The NDI sensor data processor 20 is configured to convert sensor data output by the NDI scanner 14 to 2-D scan image data 22. In addition, the system 10 includes an image processing and feature point comparison module 24 which is communicatively coupled to receive 2-D scan image data 22 from the NDI sensor data processor 20. The image processing and feature point comparison module 24 may be a processor or computer configured (e.g., programmed) to track the location (also referred to herein as "localization") of the NDI scanner 14 relative to the surface of the target object using the 2-D scan image data 22. The localization algorithm includes a relative motion updating process based on following scanned features from one captured NDI scan image to the next in order to determine the motion of 2-D sensor array relative to its location during the previous image acquisition.

The image processing and feature point comparison module 24 outputs relative location data 26 to the motion controller which may be used for controlling the motion of the motion platform 12. For example, the pixel difference between the respective representations of the common feature point is counted and converted to a physical distance traveled by the 2-D sensor array. Optionally (as depicted in FIG. 10), the relative location data 26 is also sent to the NDI sensor data processor 20, where it may be used to construct a composite scan image.

Figure 11:
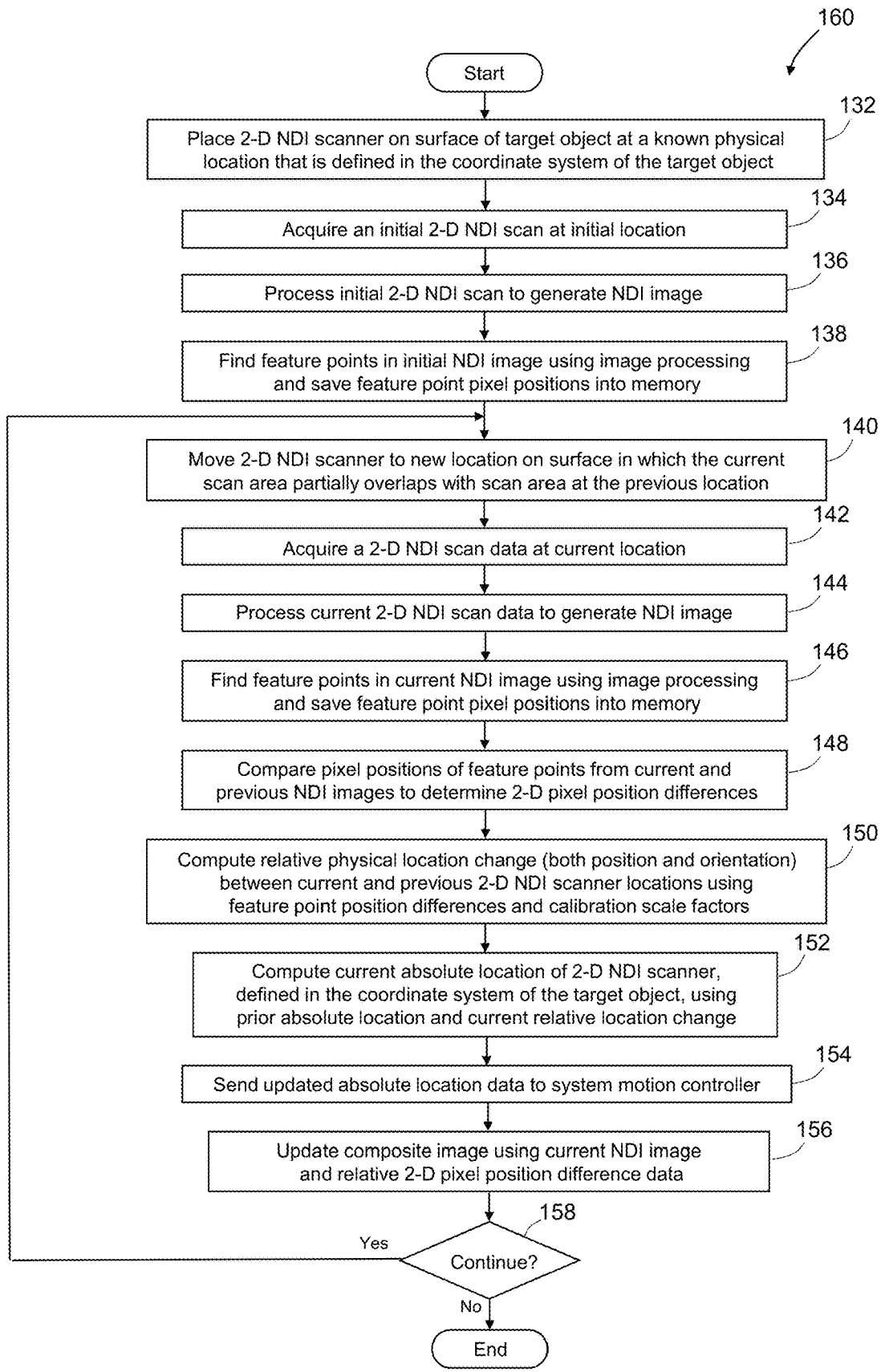
FIG. 11 is a flowchart identifying steps of a method for constructing a composite scan image using an automated motion platform of the type partly depicted in FIG. 10 comprising a two-dimensional array of sensors and a computer system configured to track the location of the automated motion platform during scanning based on non-visual (e.g., NDI) data acquired by the sensor array.

FIG. 11 is a flowchart identifying steps of a method 160 for constructing a composite scan image using an automated motion platform 12 equipped with an NDI scanner 14 comprising a two-dimensional array of sensors and a computer system configured to track the location of the motion platform during scanning based on non-visual (e.g., NDI) data acquired by the sensor array and construct a composite scan image by stitching the acquired scan images together. The method 160 is applicable to either manual or automated motion control. First, the motion platform 12 is placed so that the 2-D sensor array of the NDI scanner 14 is located at a known physical location (hereinafter "initial location") that is defined in the frame of reference of a target object (step 132). Thereafter, steps 134, 136, 138, 140, 142, 144 and 146 are performed as previously described with reference to FIG. 3. The image processing and feature point comparison module 24 then compares the respective pixel positions of common feature points appearing in the previous and current scan images (in this iteration, the first and second scan images) to determine 2-D pixel position differences (step 148). Then the image processing and feature point comparison module 24 computes a relative physical location change (both position and orientation) between the current and previous locations of the NDI scanner 14 using the 2-D pixel position differences of the common feature points and calibration scale factors (step 150). The image processing and feature point comparison module 24 (or a different computer or processor) may then compute the current absolute location of the NDI scanner 14, defined in a coordinate system (frame of reference) of the target object (e.g., an X-Y coordinate system associated with the surface of the target object, as described above), using the prior absolute location and the current relative location change (step 152). The updated absolute location data is then sent to the system motion controller (step 154). In addition, the composite scan image is updated using the current NDI scan image and the relative 2-D pixel position difference data computed in step 156. A determination is then made whether the localization process should continue (step 158). If a determination is made in step 158 that the localization process should continue, method 130 returns to step 140. Then the next scan image is acquired, which third scan image will have some common features in common with the second scan image, and so forth. Otherwise, if a determination is made in step 158 that the localization process should not continue, then method 160 is terminated.

The algorithm depicted in FIG. 11 extends the general localization process depicted in FIG. 3 to address a specific type of NDI use case, which is to generate a composite image from a series of individual images using relative location (position and orientation) offsets in pixel space. In addition, the location data is used in this process by the motion controller to enable automated motion of the system (e.g., by a robot). However, it should be appreciated that the composite image creation and automated motion control aspects may be used independently and need not be combined.

Figure 12:
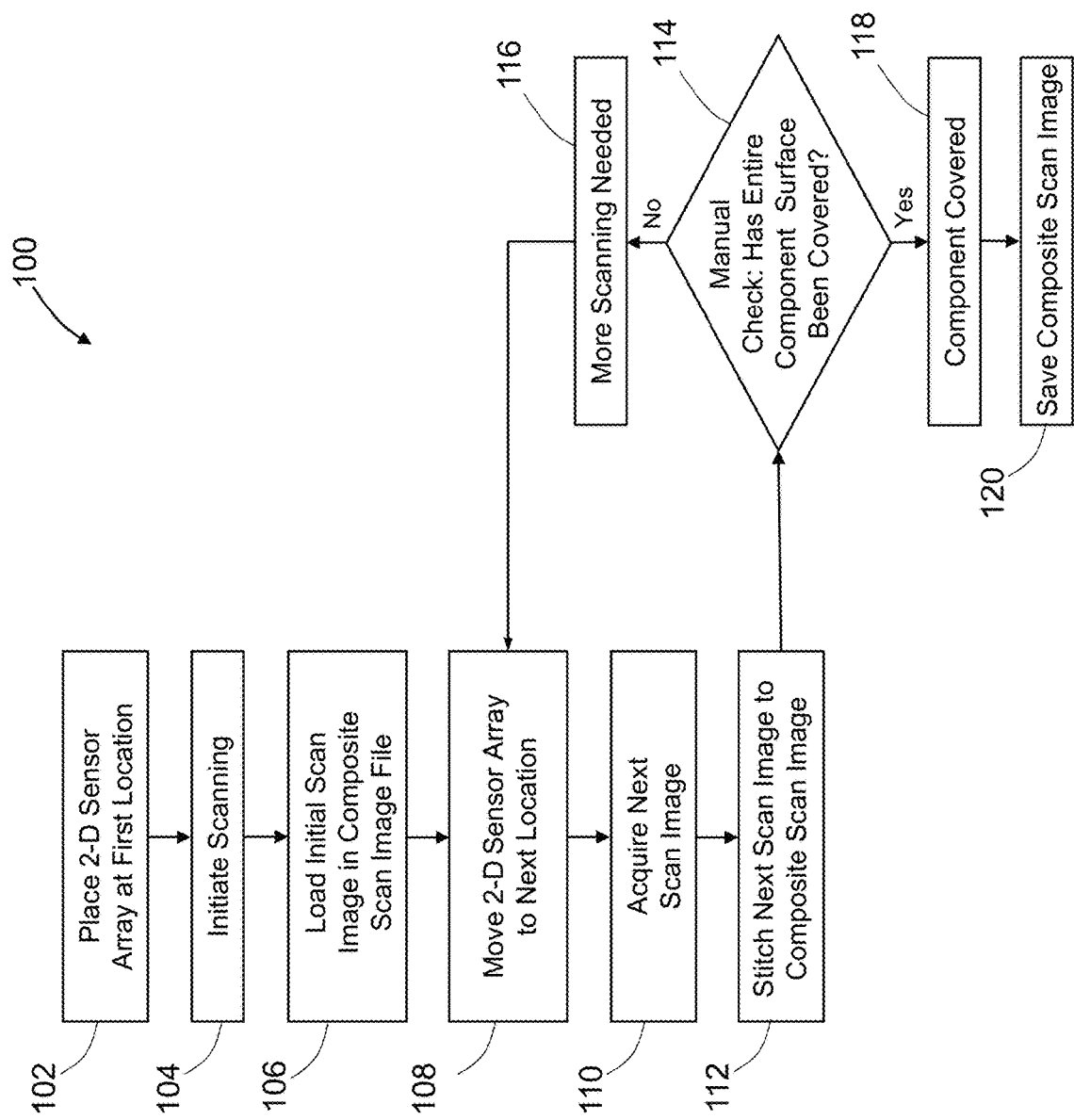
FIG. 12 is a flowchart identifying steps of a method for acquiring a composite scan image of a target object using a movable two-dimensional array of sensors in accordance with one embodiment.

FIG. 12 is a flowchart identifying steps of a method 100 for constructing (creating) a composite scan image of a target object using a movable two-dimensional array of sensors in accordance with one embodiment. Each scan image is acquired in the manner described above, to wit, by acquiring sensor data, generating scan images from that sensor data, finding the feature points and comparing the positions of the feature points in subsequent scan images to determine which feature points are common between the two images, and then determining the offsets. Initially, the 2-D sensor array is placed at a first location with known position coordinates and a known orientation angle (step 102). Then the NDI scanner is activated to acquire an initial scan image (hereinafter "first scan image") from a first portion of the target object confronting the sensor array (step 104). Subsequent to initial scan image acquisition, the system operator (e.g., technician or inspector) verifies that the first scan image includes at least two distinguishable features. If at least two features are distinguishable, then the first scan image is loaded into a composite scan image file for storage (step 106). Then the 2-D sensor array is moved to the next location (step 108). The next location is selected so that the 2-D sensor array overlies at least two of the distinguishable features seen in the previous (in this iteration, the first) scan image. While at the next location, the NDI scanner is activated to acquire sensor data and then the NDI sensor data processor generates the next (in this iteration, the second) scan image (step 110). The next scan image is then stitched to the composite scan image (step 112). In the iteration wherein the second scan image is stitched to the first scan image, the composite scan image is constructed by aligning second scan image data in the second scan image with first scan image data in the first scan image using common features in the first and second scan images. More generally, in subsequent iterations, the next scan image is aligned with the composite scan image using common features. In accordance with one option, the composite scan image includes pixel data from the first scan image and pixel data from a portion of the second scan image that does not overlap the first scan image. In accordance with another option, the composite scan image includes: pixel data from a first portion of the first scan image that is not overlapped by the second scan image; pixel data from a first portion of the second scan image that does not overlap the first scan image; and pixel data which is a blend of pixel data from a second portion of the second scan image that overlaps the first scan image and pixel data from a second portion of the first scan image that is overlapped by the second scan image.

After each successively acquired scan image is amalgamated to with the composite scan image, the technician performs a manual check to determine whether the entire surface of the component being inspected has been covered or not (step 114). If a determination is made in step 114 that the entire surface of the component has not been covered, then the technician uses an interface to notify the controller (e.g., computer system 40 in FIG. 15) that more scanning is needed (step 116). The algorithm depicted in FIG. 12 then returns to step 108, in which case the 2-D sensor array is moved to the next location confronting an uninspected portion of the component. If a determination is made in step 114 that the entire surface of the component has been covered, then the technician uses the interface to notify the controller that scanning is terminated (step 118). The composite scan image file is then saved in an NDI Results directory in a non-transitory tangible computer-readable storage medium for subsequent analysis (step 120).

Figure 13:
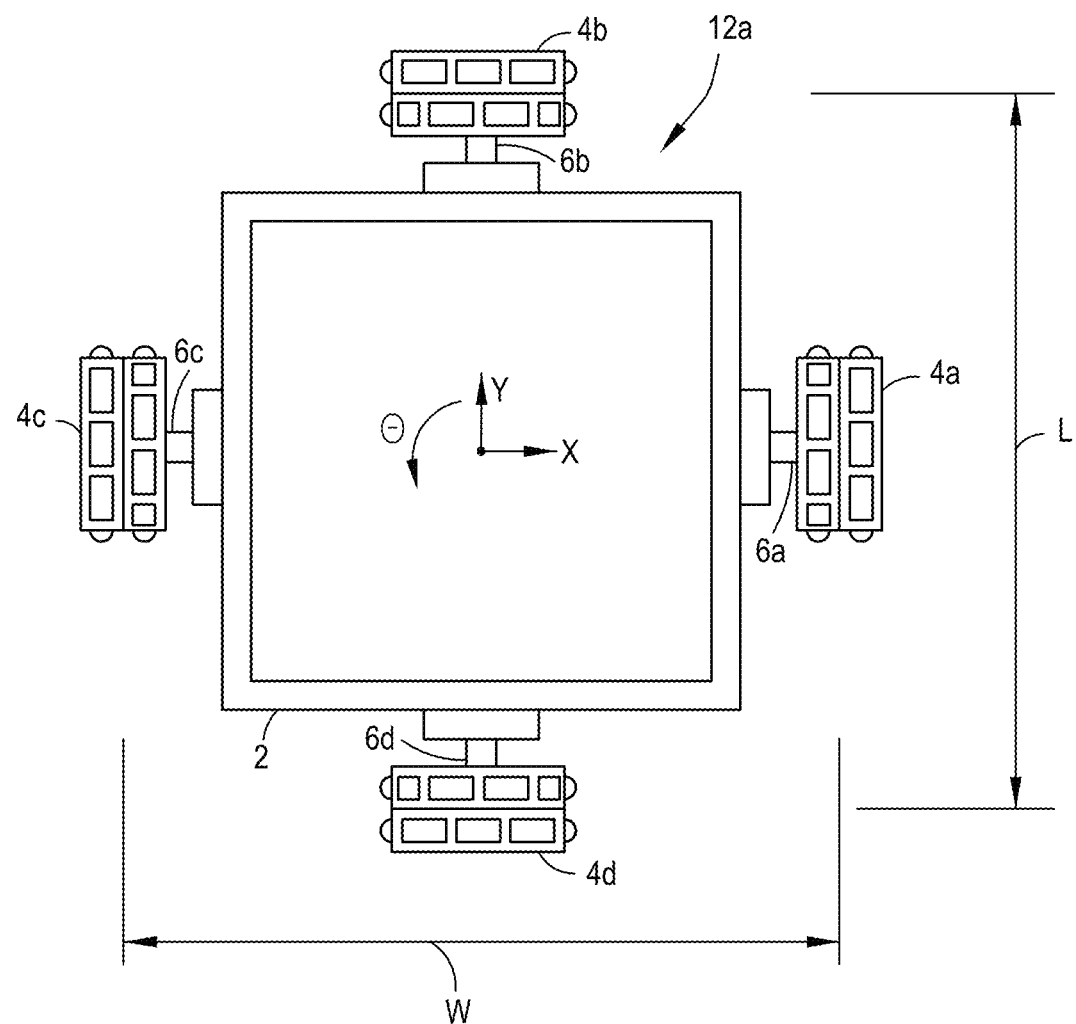
FIG. 13 is a diagram representing a top planar view of some components of a holonomic-motion device in accordance with one embodiment. This device can be connected to an NDI scanner (not shown).

As previously disclosed, the motion platform may be designed for manual movement. FIG. 13 shows a top planar view of some components of a holonomic-motion hand-held tracking device 12a in accordance with a four-omni wheel configuration. This tracking device can be connected to an NDI scanner (not shown in FIG. 13, but see NDI scanner 14 in FIG. 14A). The holonomic-motion hand-held tracking device 12a shown in FIG. 13 comprises a rectangular frame 4 and four double-row omni wheels 4a-4d rotatably mounted to frame 4 by means of respective axles 6a-6d and axle bearings (not shown). In this particular implementation, axles 6a and 6c are coaxial; axles 6b and 6d are coaxial; and axles 6a, 6c are perpendicular to axle 6b, 6d. This embodiment shows optional double-row omni wheels (which may improve rolling smoothness in some conditions), but single-row omni wheels may also be used. In alternative embodiments, the tracking device does not have wheels and instead slides across the surface.

Figure 14A:
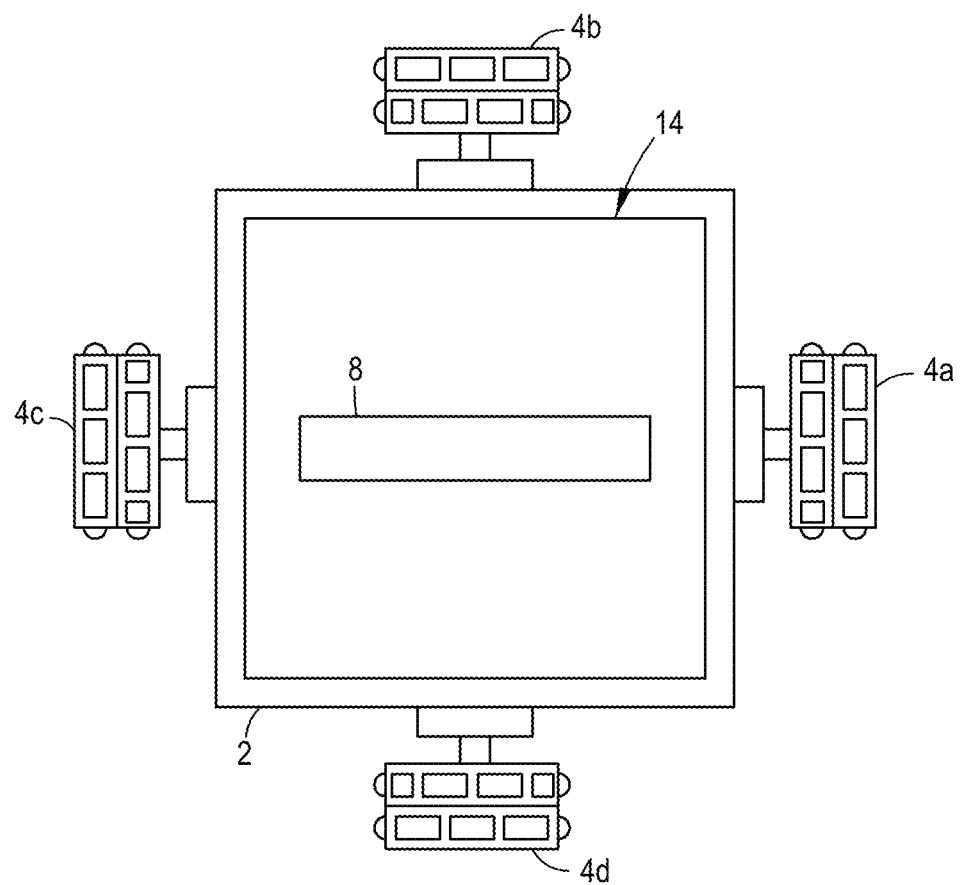
FIGS. 14A and 14B are diagrams respectively representing a top planar view and a front view of a hand-held scanning device comprising an NDI scanner connected to a holonomic-motion device of the type graphically depicted in FIG. 13.
Figure 14B:
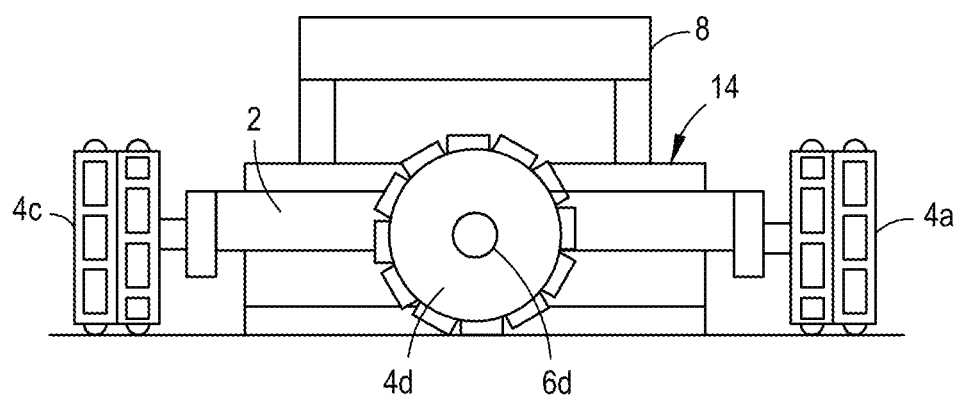

FIGS. 14A and 14B respectively show top planar and front views, respectively, of a hand-held scanning device comprising an NDI scanner 14 rigidly connected to a holonomic-motion hand-held tracking device 12a of the type graphically depicted in FIG. 13. The NDI scanner 14 is carried by the holonomic-motion hand-held tracking device 12a. The NDI scanner 14 has a handle 8 attached thereto by means of which the operator can manually move the scanning device in any direction with or without rotation. One or more of the omni wheels may be mounted in such a way as to allow compliance between the support frame and wheel assembly (for example, using linear guides and springs). This allows the wheels to stay in contact with the surface in the event that the surface is not perfectly flat.

One possible use for a manually moved system that does not use the NDI sensor data for creation of a composite scan image would be for general localization, where the current position and orientation of the NDI scanner is displayed for the user. In some use cases, the user may be looking at a display of a single NDI scan image and want to extract position coordinates of a single point of interest. Another use case that does not involve inspection would be to use the manually moved device as a type of digital tape measure (with the location data displayed on a screen).

Figure 15:
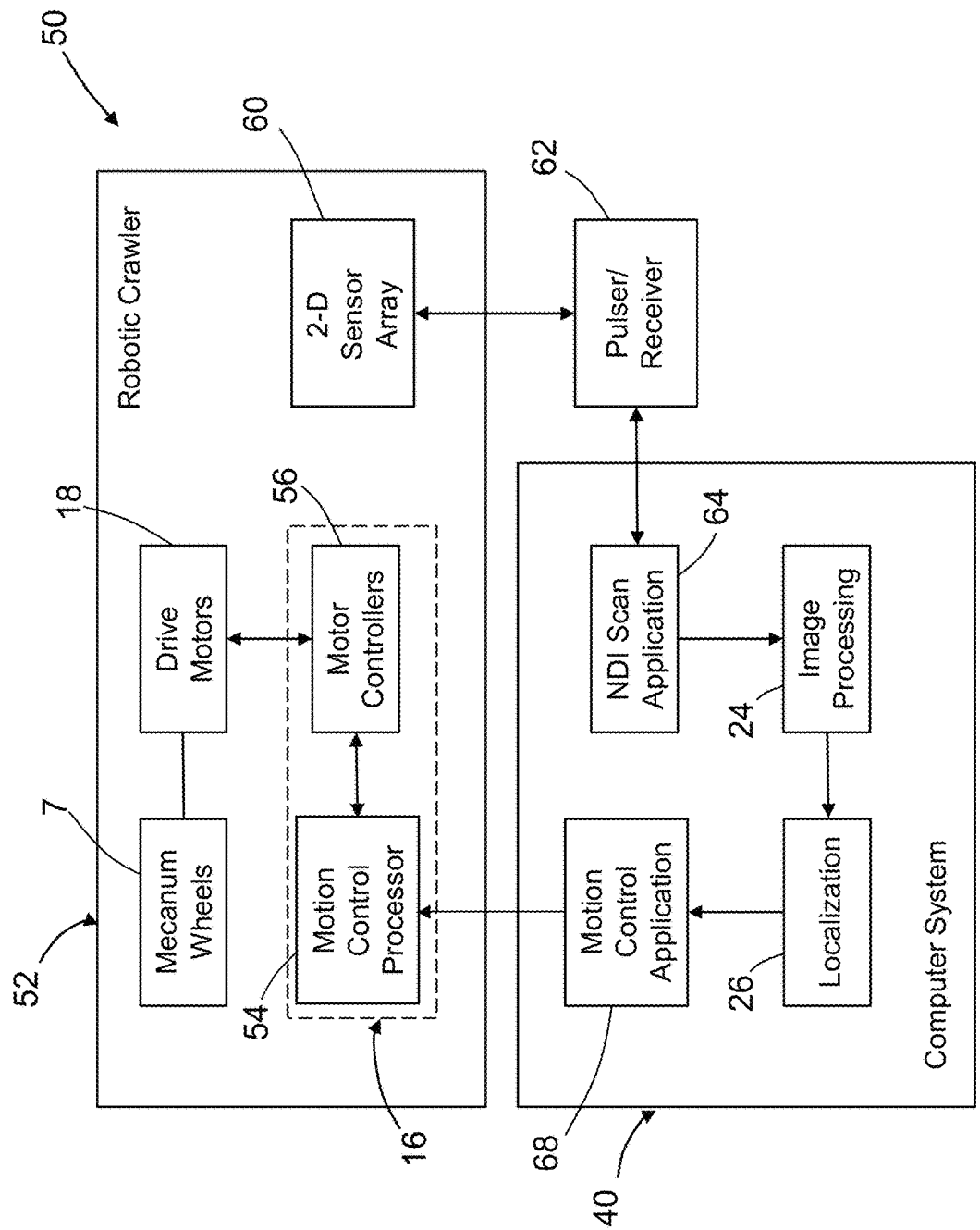
FIG. 15 is a block diagram identifying some components of a system that includes a 2-D sensor array mounted to a robotic crawler vehicle and a computer system configured to control the scanning position of the 2-D sensor array based on images acquired by the 2-D sensor array.

FIG. 15 is a block diagram identifying some components of a system 50 that includes a 2-D sensor array 60 (e.g., an ultrasonic transducer array) mounted to a Mecanum-wheeled robotic crawler vehicle 52 (hereinafter "crawler vehicle 52") in accordance with one embodiment. In alternative embodiments, omni wheels or other types of wheels could be used. The system 50 further includes a computer system 40 configured to control the scanning position of the 2-D sensor array 60 and the acquisition of sensor data by the 2-D sensor array 60. The scanning position is controlled based on common features in scan images derived from the sensor data acquired by the 2-D sensor array 60 from the component being inspected, as previously described herein.

The crawler vehicle 52 includes a motion controller 16 and a multiplicity of Mecanum wheels 7 operatively coupled to respective drive motors 18. The motion controller 16 includes a motion control processor 54 and a multiplicity of motor controllers 56 for independently controlling the drive motors 18 in accordance with control signals received from the motion control processor 54. The motion control processor 54 in turn receives commands from the computer system 40. The computer system 40 may be communicatively coupled to the motion control processor 54 via an electrical cable (not shown in FIG. 15) or wirelessly via transceivers. The computer system 40 uses relative location information to track the relative location (e.g., relative to an initial absolute location acquired using a local positioning system) of the crawler vehicle 52.

More specifically, the computer system 40 is programmed with NDI scan application software 64 and motion control application software 68. The computer system 40 may comprise a general-purpose computer. The NDI scan application software 64 is configured to control a pulser/receiver 62. In accordance with the architecture depicted in FIG. 15, the pulser/receiver 62 is coupled to the 2-D sensor array 60 carried by the crawler vehicle 52. The pulser/receiver 62 sends pulses to and receives return signals from the 2-D sensor array 60. The NDI scan application software 64 running on computer system 40 controls all details of the image scan data and the display of that data.

In addition, the computer system 40 hosts the image processing and feature point comparison module 24, which outputs relative location data 26. The motion control application 68 is configured to control the motion of the crawler vehicle 52 to continue to follow the original pre-defined (planed) scan path based on the localization updates received from the image processing and feature point comparison module 24. In accordance with one embodiment, the motion control application software 68 is configured to estimate the position of the crawler vehicle 52 in absolute coordinates following the completion of a motion that was tracked using the relative location data 26. The current location of the stopped device can be checked periodically to determine to what extent it may deviate from the desired location. In accordance with the teachings herein, corrections can be made to the relative motion measurements by acquiring accurate, absolute measurements at lower update rates. This absolute measurement process (performed while the target object is stopped) can be integrated into a relative motion measurement system running at higher update rates, which acquires relative motion measurements while the target object is moving. In accordance with one embodiment disclosed hereinafter, a lower-update-rate local positioning system-based process provides corrections to a higher-update-rate localization process.

In addition to mapping subsurface features, the absolute position measurements may be used to map the location of surface and subsurface anomalies in the target object. The mapping of the defect size, shape, and depth to a CAD model of the target object will enable finite element analysis of the defect in the structure, analysis of its effects on structural performance, and repair analysis and planning.

Only the processor that is creating the composite scan image needs access to both the NDI scan images and the relative location data. In accordance with some embodiments, the task of constructing the composite scan image may be handled by the NDI sensor data processor 20. In accordance with other embodiments, the composite scan image creation task is handled by a separate process (or processor). In a typical application, the joining of the individual scan images into a larger composite scan image is handled by the same processor that creates the individual images from the raw NDI sensor data (because of the way the hardware is packaged by the vendor for the convenience of having it in a single unit). But this image manipulation does not have to be done that way. In the alternative, the individual scan images may be output by the NDI sensor data processor 20 and sent to a separate processor to stitch the scan images together to make a single large composite scan image.

The analysis of the common features between pairs of NDI scan images by the image processing method to find position differences between the same common features in each scan image lets the composite scan image stitching method know how much those images are offset from each other. By knowing that information (common feature position and orientation differences), the current scan image can be correctly aligned with composite scan image. If the common features in the images are aligned, then the images are aligned. This alignment happens independently of the generation of the position and orientation tracking data, which means that even if errors are growing in the tracking data, the scan images will still be aligned.

The location tracking correction could be performed manually (human-assisted), where a person identifies common known landmarks in CAD model data and NDI scan image data, and forces the estimate to align with the known coordinates. Or the correction process could be automated by using suitably prepared references images. These reference images could be from prior NDI scans where the coordinates of landmarks have already been identified, or the data could come from CAD model data with known coordinates for landmarks.

In accordance with one proposed implementation, the 2-D sensor array takes the form of an array of ultrasonic transducer elements configured to enable the production and display of a C-scan of a small area. Many different ultrasonic transducer element configurations can be employed. For example, the ultrasonic transducer array may comprise an array of transmit/receive electrodes arranged in rows and columns in a pixel-type configuration. In an alternative configuration, the ultrasonic transducer array comprises a set of mutually parallel elongated transmit electrodes which overlap and cross a set of mutually parallel elongated receive electrodes at a non-zero angle. An ultrasonic transducer array can be used to inspect any number of structures in a variety of industries where detection of flaws or anomalies in the structure is required, such as in the aircraft, automotive, marine, or construction industries. The ultrasonic transducer array is capable of detecting any number of flaws or anomalies within or on the surface of the structure, such as impact damage (e.g., delaminations and matrix cracking), disbonds (e.g., airframe/reinforcing members or honeycomb composites), discontinuities, voids, or porosity, which could adversely affect the performance of the structure.

Certain systems, apparatus, applications or processes have been described herein as including a number of modules. A module may be a unit of distinct functionality that may be implemented in software, hardware, or combinations thereof, except for those modules which are preferably implemented as hardware or firmware to enable streaming calculations as disclosed herein. When the functionality of a module is performed in any part through software, the module can include a non-transitory tangible computer-readable storage medium.

While systems and methods for tracking the location of an NDI scanner using scan images acquired from the target object have been described with reference to particular embodiments, it will be understood by those skilled in the art that various changes may be made and equivalents may be substituted for elements thereof without departing from the scope of the teachings herein. In addition, many modifications may be made to adapt a particular situation to the teachings herein without departing from the essential scope thereof. Therefore, it is intended that the claims set forth hereinafter not be limited to the disclosed embodiments.

As used herein, the term "computer system" should be construed broadly to encompass a system having at least one computer or processor, and which may have multiple computers or processors that are communicatively coupled by means of a network or bus. As used in the preceding sentence, the terms "computer" and "processor" both refer to devices comprising a processing unit (e.g., a central processing unit) and some form of memory (e.g., non-transitory tangible computer-readable storage medium) for storing a program which is readable by the processing unit.

The methods described herein may be encoded as executable instructions embodied in a non-transitory tangible computer-readable storage medium, including, without limitation, a storage device and/or a memory device. Such instructions, when executed by a processor or computer, cause the processor or computer to perform at least a portion of the methods described herein.

The method claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the method claims be construed to exclude any portions of two or more steps being performed concurrently or alternatingly unless the claim language explicitly states a condition that precludes such an interpretation. For example, the steps of determining which feature points are common feature points and computing pixel position differences between the common feature points may be performed separately or concurrently.

The invention claimed is:

1. A method for tracking a location of a scanner, the method comprising:
   (a) placing a sensor array of a scanner adjacent to a surface of a target object so that the sensor array overlies a first structural feature of the target object with a reference point on the sensor array at a first position having first X and first Y position coordinates on the surface of the target object which are known, wherein the sensor array is two-dimensional;
   (b) acquiring a first set of sensor data from a first portion of the target object confronting the sensor array while the reference point is at the first position;
   (c) converting the first set of sensor data to first scan image data of a first scan image;
   (d) translating the scanner over the surface of the target object until the reference point is at a second position at a distance from the first position while the sensor array again overlies the first structural feature;
   (e) acquiring a second set of sensor data from a second portion of the target object confronting the sensor array while the reference point is at the second position;
   (f) converting the second set of sensor data to second scan image data of a second scan image;
   (g) finding feature points in the first and second scan images;
   (h) determining which feature points found in step (g) are common feature points in the first and second scan images;
   (i) computing pixel position differences between the common feature points; and
   (j) calculating a second Y position coordinate of the reference point at the second position on the surface of the target object based at least partly on the first Y position coordinate and the pixel position differences computed in step (i),
   wherein step (i) comprises:
   calculating a first pixel offset equal to a number of pixel rows of the sensor array by which the position of a common feature point in the second scan image is offset from the position of the common feature point in the first scan image; and wherein step (j) comprises:
   multiplying the first pixel offset by a distance between adjacent sensor rows to form a product equal to a first distance translated by the scanner in a direction perpendicular to the sensor rows during step (d); and
   adding the first distance to the first Y position coordinate to derive the second Y position coordinate of the reference point.

2. The method as recited in claim 1, further comprising:
   (k) calculating a second X position coordinate of the reference point on the surface of the target object based at least partly on the first X position coordinate and the pixel position differences computed in step (i).

3. A method for tracking a location of a scanner, the method comprising:
   (a) placing a sensor array of a scanner adjacent to a surface of a target object so that the sensor array overlies a first structural feature of the target object with a reference point on the sensor array at a first position having first X and first Y position coordinates on the surface of the target object which are known, wherein the sensor array is two-dimensional;
   (b) acquiring a first set of sensor data from a subsurface structure of a first portion of the target object confronting the sensor array while the reference point is at the first position;
   (c) converting the first set of sensor data to first scan image data of a first scan image;
   (d) translating the scanner over the surface of the target object until the reference point is at a second position at a distance from the first position while the sensor array again overlies the first structural feature;
   (e) acquiring a second set of sensor data from a subsurface structure of a second portion of the target object confronting the sensor array while the reference point is at the second position;
   (f) converting the second set of sensor data to second scan image data of a second scan image;
   (g) finding subsurface feature points in the first and second scan images;
   (h) determining which subsurface feature points found in step (g) are common feature points in the first and second scan images;
   (i) computing pixel position differences between the common feature points;
   (j) calculating a second Y position coordinate of the reference point at the second position on the surface of the target object based at least partly on the first Y position coordinate and the pixel position differences computed in step (i); and
   (k) calculating a second X position coordinate of the reference point on the surface of the target object based at least partly on the first X position coordinate and the pixel position differences computed in step (i),
   wherein step (i) comprises:
   calculating a first pixel offset equal to a number of pixel rows by which the position of a common feature point in the second scan image is offset from the position of the common feature point in the first scan image; and
   calculating a second pixel offset equal to a number of pixel columns by which the position of the common feature point in the second scan image is offset from the position of the common feature point in the first scan image,
   wherein step (j) comprises:
   multiplying the first pixel offset by a distance between adjacent sensor rows to form a product equal to a first distance translated by the scanner in a direction perpendicular to the sensor rows during step (d); and adding the first distance to the first Y position coordinate to derive the second Y position coordinate, and wherein step (k) comprises:

multiplying the second pixel offset by a distance between adjacent sensor columns to form a product equal to a second distance translated by the scanner in a direction parallel to the sensor rows during step (d); and adding the second distance to the first X position coordinate to derive the second X position coordinate.

4. The method as recited in claim 3, further comprising calculating a distance between a first point having the first X and first Y position coordinates and a second point having the second X and second Y position coordinates.

5. The method as recited in claim 3, further comprising processing the first and second scan images to form a composite scan image by aligning the second scan image data in the second scan image with the first scan image data in the first scan image using common feature points in the first and second scan images.

6. The method as recited in claim 5, further comprising:
finding a subsurface feature point in the composite scan image representing a second structural feature in the target object;
calculating a third Y position coordinate of the subsurface feature point based at least partly on the first Y position coordinate of the reference point; and
calculating a third X position coordinate of the subsurface feature point based at least partly on the first X position coordinate of the reference point.

7. A method for tracking a location of a scanner, the method comprising:
(a) placing a sensor array of a scanner adjacent to a surface of a target object so that the sensor array overlies first and second structural features of the target object and is oriented at a first orientation angle which is known;
(b) acquiring a first set of sensor data from a subsurface structure of a first portion of the target object confronting the sensor array while the sensor array is oriented at the first orientation angle;
(c) converting the first set of sensor data to first scan image data of a first scan image;
(d) orienting the scanner so that the sensor array has a second orientation angle different than the first orientation angle and again overlies the first and second structural features;
(e) acquiring a second set of sensor data from a subsurface structure of a second portion of the target object confronting the sensor array while the sensor array is oriented at the first orientation angle;
(f) converting the second set of sensor data to second scan image data of a second scan image;
(g) finding subsurface feature points in the first and second scan images;
(h) determining which subsurface feature points found in step (g) are common feature points in the first and second scan images;
(i) computing pixel position differences between first and second common feature points; and
(j) calculating the second orientation angle based at least partly on the first orientation angle and a difference of a first angle of a first line connecting respective positions of the first and second common feature points in the first scan image and a second angle of a second line connecting respective positions of the first and second common feature points in the second scan image, wherein step (i) comprises:

calculating a first pixel offset equal to a number of pixel rows by which the position of the second common feature point in the first scan image is offset from the position of the first common feature point in the first scan image;

calculating a second pixel offset equal to a number of pixel columns by which the position of the second common feature point in the first scan image is offset from the position of the first common feature point in the first scan image;

calculating a third pixel offset equal to a number of pixel rows by which the position of the second common feature point in the second scan image is offset from the position of the first common feature point in the second scan image; and calculating a fourth pixel offset equal to a number of pixel columns by which the position of the second common feature point in the second scan image is offset from the position of the first common feature point in the second scan image, wherein the first angle has a tangent equal to a ratio of the first pixel offset to the second pixel offset and the second angle has a tangent equal to a ratio of the third pixel offset to the fourth pixel offset.

8. The method as recited in claim 7, further comprising processing the first and second scan images to form a composite scan image by aligning the second scan image data in the second scan image with the first scan image data in the first scan image using common feature points in the first and second scan images.

9. The method as recited in claim 8, wherein the composite scan image includes pixel data from the first scan image and pixel data from a portion of the second scan image that does not overlap the first scan image.

10. The method as recited in claim 8, wherein the composite scan image includes:
pixel data from a first portion of the first scan image that is not overlapped by the second scan image;
pixel data from a first portion of the second scan image that does not overlap the first scan image; and
pixel data which is a blend of pixel data from a second portion of the second scan image that overlaps the first scan image and pixel data from a second portion of the first scan image that is overlapped by the second scan image.

11. The method as recited in claim 8, further comprising:
finding a subsurface feature point in the composite scan image associated with a second structural feature in the target object;
calculating a third Y position coordinate of the subsurface feature point based at least partly on the first Y position coordinate of the reference point; and
calculating a third X position coordinate of the subsurface feature point based at least partly on the first X position coordinate of the reference point.

12. A system comprising a frame, a scanner supported by the frame and comprising a two-dimensional array of sensors, a robotic system configured to enable motorized movement of the frame, and a computer system communicatively coupled to receive sensor data from the sensors and send control signals to the robotic system for controlling motorized movement of the frame and configured to perform operations comprising:

(a) activating the sensors while the sensor array overlies a first structural feature of a target object with a reference point on the sensor array at a first position having first X and first Y position coordinates on a surface of a target object which are known;
(b) receiving a first set of sensor data acquired from a subsurface structure of a first portion of the target object confronting the sensor array while the reference point is at the first position;
(c) converting the first set of sensor data to first scan image data of a first scan image;
(d) activating the sensors while the sensor array overlies the first structural feature of a target object with the reference point at a second position at a distance from the first position;
(e) receiving a second set of sensor data acquired from a subsurface structure of a second portion of the target object confronting the sensor array while the reference point is at the second position;
(f) converting the second set of sensor data to second scan image data of a second scan image;
(g) finding subsurface feature points in the first and second scan images;
(h) determining which subsurface feature points found in step (g) are common feature points in the first and second scan images;
(i) computing pixel position differences between the common feature points; and
(j) calculating a second Y position coordinate of the reference point at the second position on the surface of the target object based at least partly on the first Y position coordinate and the pixel position differences computed in step (i),
wherein step (i) comprises:
calculating a first pixel offset equal to a number of pixel rows by which the position of a common feature point in the second scan image is offset from the position of the common feature point in the first scan image; and
wherein step (j) comprises:
multiplying the first pixel offset by a distance between adjacent sensor rows to form a product equal to a first distance translated by the scanner in a direction perpendicular to the sensor rows during step (d); and
adding the first distance to the first Y position coordinate to derive the second Y position coordinate of the reference point.

13. The system as recited in claim 12, wherein the computer system is further configured to:
(k) calculate a second X position coordinate of the reference point on the surface of the target object based at least partly on the first X position coordinate and the pixel position differences computed in step (i).

14. The system as recited in claim 13, wherein the computer system is further configured to calculate a distance between a first point on the surface of the target object having the first X and first Y position coordinates and a second point on the surface of the target object having the second X and second Y position coordinates.

15. The system as recited in claim 12, wherein the computer system is further configured to process the first and second scan images to form a composite scan image by aligning the second scan image data in the second scan image with the first scan image data in the first scan image using common feature points in the first and second scan images.

16. The system as recited in claim 15, wherein the computer system is further configured to perform operations comprising:
finding a subsurface feature point in the composite scan image associated with a second structural feature in the target object;
calculating a third Y position coordinate of the subsurface feature point based at least partly on the first Y position coordinate of the reference point; and
calculating a third X position coordinate of the subsurface feature point based at least partly on the first X position coordinate of the reference point.

17. A system comprising a frame, a scanner supported by the frame and comprising a two-dimensional array of sensors, a robotic system configured to enable motorized movement of the frame, and a computer system communicatively coupled to receive sensor data from the sensors and send control signals to the robotic system for controlling motorized movement of the frame and configured to perform operations comprising:
(a) activating the sensors while the sensor array overlies a first structural feature of a target object with a reference point on the sensor array at a first position having first X and first Y position coordinates on a surface of a target object which are known;
(b) receiving a first set of sensor data acquired from a subsurface structure of a first portion of the target object confronting the sensor array while the reference point is at the first position;
(c) converting the first set of sensor data to first scan image data of a first scan image;
(d) activating the sensors while the sensor array overlies the first structural feature of a target object with the reference point at a second position at a distance from the first position;
(e) receiving a second set of sensor data acquired from a subsurface structure of a second portion of the target object confronting the sensor array while the reference point is at the second position;
(f) converting the second set of sensor data to second scan image data of a second scan image;
(g) finding subsurface feature points in the first and second scan images;
(h) determining which subsurface feature points found in step (g) are common feature points in the first and second scan images;
(i) computing pixel position differences between the common feature points;
(j) calculating a second Y position coordinate of the reference point at the second position on the surface of the target object based at least partly on the first Y position coordinate and the pixel position differences computed in step (i); and
(k) calculating a second X position coordinate of the reference point on the surface of the target object based at least partly on the first X position coordinate and the pixel position differences computed in step (i),
wherein step (i) comprises:
calculating a first pixel offset equal to a number of pixel rows by which the position of a common feature point in the second scan image is offset from the position of the common feature point in the first scan image; and
calculating a second pixel offset equal to a number of pixel columns by which the position of the common feature point in the second scan image is offset from the position of the common feature point in the first scan image, wherein step (j) comprises:
multiplying the first pixel offset by a distance between adjacent sensor rows to form a product equal to a first distance translated by the scanner in a direction perpendicular to the sensor rows during step (d); and
adding the first distance to the first Y position coordinate to derive the second Y position coordinate, and
wherein step (k) comprises:
multiplying the second pixel offset by a distance between adjacent sensor columns to form a product equal to a second distance translated by the scanner in a direction parallel to the sensor rows during step (d); and
adding the second distance to the first X position coordinate to derive the second X position coordinate.

\* \* \* \* \*